(12) United States Patent
Hilloulin et al.

(10) Patent No.: US 12,361,065 B2
(45) Date of Patent: Jul. 15, 2025

(54) EFFICIENT, IN-MEMORY, RELATIONAL REPRESENTATION FOR HETEROGENEOUS GRAPHS

(71) Applicant: Oracle International Corporation, Redwood Shores, CA (US)

(72) Inventors: Damien Hilloulin, Zurich (CH); Davide Bartolini, Obersiggenthal (CH); Oskar Van Rest, Mountain View, CA (US); Alexander Weld, Mountain View, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 117 days.

(21) Appl. No.: 17/330,046

(22) Filed: May 25, 2021

(65) Prior Publication Data
US 2021/0279282 A1 Sep. 9, 2021

Related U.S. Application Data

(62) Division of application No. 15/956,115, filed on Apr. 18, 2018, now Pat. No. 11,120,082.

(51) Int. Cl.
*G06F 16/901* (2019.01)
*G06F 16/22* (2019.01)
*G06F 16/28* (2019.01)

(52) U.S. Cl.
CPC ...... *G06F 16/9024* (2019.01); *G06F 16/2237* (2019.01); *G06F 16/288* (2019.01)

(58) Field of Classification Search
CPC . G06F 16/9024; G06F 16/2237; G06F 16/288
See application file for complete search history.

(56) References Cited

U.S. PATENT DOCUMENTS 5,822,592 A 10/1998 Zhu
7,624,081 B2 11/2009 Zhao
(Continued)

OTHER PUBLICATIONS

Xirogiannopoulos et al., "Extracting and Analyzing Hidden Graphs from Relational Databases", ACM, Sigmod dated 2017, 18 pages.
(Continued)

*Primary Examiner* — Apu M Mofiz
*Assistant Examiner* — J Mitchell Curran
(74) *Attorney, Agent, or Firm* — Hickman Becker Bingham Ledesma LLP; Brian Miller

(57) ABSTRACT

Techniques are provided herein for efficient representation of heterogeneous graphs in memory. In an embodiment, vertices and edges of the graph are segregated by type. Each property of a type of vertex or edge has values stored in a respective vector. Directed or undirected edges of a same type are stored in compressed sparse row (CSR) format. The CSR format is more or less repeated for edge traversal in either forward or reverse direction. An edge map translates edge offsets obtained from traversal in the reverse direction for use with data structures that expect edge offsets in the forward direction. Subsequent filtration and/or traversal by type or property of vertex or edge entails minimal data access and maximal data locality, thereby increasing efficient use of the graph.

18 Claims, 14 Drawing Sheets

(56) References Cited

U.S. PATENT DOCUMENTS

| | | | |
|---|---|---|---|
| 8,996,492 B2 | 3/2015 | Paradies | |
| 9,195,941 B2 | 11/2015 | Mojsilovic | |
| 10,599,656 B1 | 3/2020 | Sharma | |
| 11,222,072 B1* | 1/2022 | Bourne | G06F 16/2237 |
| 2009/0157997 A1* | 6/2009 | Leonenko | G06T 15/06 |
| | | | 707/999.102 |
| 2011/0307685 A1 | 12/2011 | Song | |
| 2015/0026158 A1 | 1/2015 | Jin | |
| 2015/0310644 A1 | 10/2015 | Zhou | |
| 2016/0012108 A1* | 1/2016 | Hu | G06F 16/24532 |
| | | | 707/771 |
| 2016/0019228 A1 | 1/2016 | Hong | |
| 2016/0071233 A1 | 3/2016 | Macko | |
| 2016/0078344 A1 | 3/2016 | Agarwal | |
| 2016/0140152 A1 | 5/2016 | Sevenich | |
| 2016/0179887 A1 | 6/2016 | Lisonbee | |
| 2016/0299991 A1 | 10/2016 | Hong | |
| 2017/0068748 A1* | 3/2017 | Hu | G06F 16/9017 |
| 2018/0357329 A1* | 12/2018 | Meyer | G06F 16/90335 |
| 2019/0325075 A1 | 10/2019 | Hilloulin | |

OTHER PUBLICATIONS

Valiyev, Mahammad, "Graph Storage: How Good is CSR Really?", dated Dec. 10, 2017, 8 pages.

SQL Server Blog, "Graph Data Processing with SQL Server 2017 and Azure SQL Database", dated Aug. 20, 2017, 8 pages.

Oracle, "Using Property Graphs in an Oracle Database Environment", docs.oracle.com/database/122/SPGDG/using-property-graphs-oracle-database.htm#BDSPA191, Apr. 23, 2018, Apr. 23, 2018, 152 pages.

Kesheng Wu et al., "A Performance Comparison of Bitmap Indexes", proceedings of the 2001 ACM CIKM 10th International Conference on Information and Knowledge Management, dated Oct. 5, 2001, 2 pages.

Kaur, Sawinder, "Visualizing Class Diagram Using OrientDB NoSQL Data-Store", dated Jul. 2016, 5 pages.

Anonymous, "Universally Unique Identifer", Wikipedia, dated Feb. 13, 2018, www.web/2018020325/https://en.wikipedia.org/wiki/Universally_unique_identifer, 10 pages.

Ahmed Elgohary et al., "Compressed Linear Algebra for Large-Scale Machine Learning", VLDB Journal, No. 27, No. 5, dated Sep. 12, 2017, pp. 719-744.

Hilloulin, U.S. Appl. No. 15/956,115, filed Apr. 18, 2018, Office Action.

Hilloulin, U.S. Appl. No. 15/956,115, filed Apr. 18, 2018, Notice of Allowance.

Cruanes, U.S. Appl. No. 15/716,345, filed Sep. 26, 2017, Notice of Allowance.

Bartolini, U.S. Appl. No. 15/956,115, filed Apr. 18, 2018, Notice of Allowance and Fees Due.

* cited by examiner

EFFICIENT, IN-MEMORY, RELATIONAL REPRESENTATION FOR HETEROGENEOUS GRAPHS

PRIORITY CLAIM AND RELATED CASE

This application claims the benefit, under 35 U.S.C. § 120, as a Divisional of U.S. patent application Ser. No. 15/956,115, filed Mar. 18, 2018, titled "Efficient, In-Memory, Relational Representation for Heterogeneous Graphs", the entire contents of each of which is hereby incorporated by reference as if fully set forth herein. U.S. Pat. No. 9,201,944, filed Jun. 12, 2013 and titled "Techniques For Maintaining Column Vectors Of Relational Data Within Volatile Memory," is incorporated herein by reference.

FIELD OF THE DISCLOSURE

This disclosure relates to in-memory graph formats. Presented herein are techniques for encoding heterogeneous graphs for efficient use.

BACKGROUND

Property graphs are becoming an increasingly important tool for data analytics, due to their explicit and fine-grained representation of relationships between entities. A property graph is composed of vertices, which represent entities, and relationships, which connect the vertices and may be either directed (i.e. edges) or not (i.e. arcs). Vertices, edges, and arcs may have properties or attributes that describe them. In some techniques, with a property graph, vertices and edges are untyped and have a same universal set of properties, which may be NULL or have a default and/or invalid value for some vertices or edges.

In that way, a property graph is well suited to handle completely unstructured data. However, in real-world graphs, vertices and edges often have a natural concept of a type, i.e., a specific set of properties that is defined for each of them (e.g. a vertex type representing a person, with properties 'name', 'date of birth', and 'address', and another vertex type representing a book, with properties 'title', 'author', and 'ISBN'). Such graphs are heterogeneous that contain more than one kind of vertex and/or edge.

The problem we tackle with this invention is how to represent heterogeneous graphs in-memory in an efficient way that is amenable to support graph analysis algorithms and queries. Current graph analytics systems generically implement a property graph model, i.e., they treat vertices, edges, and arcs as untyped. However, that approach results in two inefficiencies when dealing with heterogeneous graphs. First is inefficient memory utilization, because all properties that are not part of the vertex or edge type will still have a default or NULL value for that element, thus consuming extra memory.

Second is inefficient memory access when performing computations that only access a subset of the types, because vertices (or edges) of a whole graph and regardless of their semantic differences, are consolidated into a same collection of all vertices (or edges). Additionally, commercial systems typically do not support mixed graphs that have both directed edges and undirected arcs.

DETAILED DESCRIPTION

Figure 1:
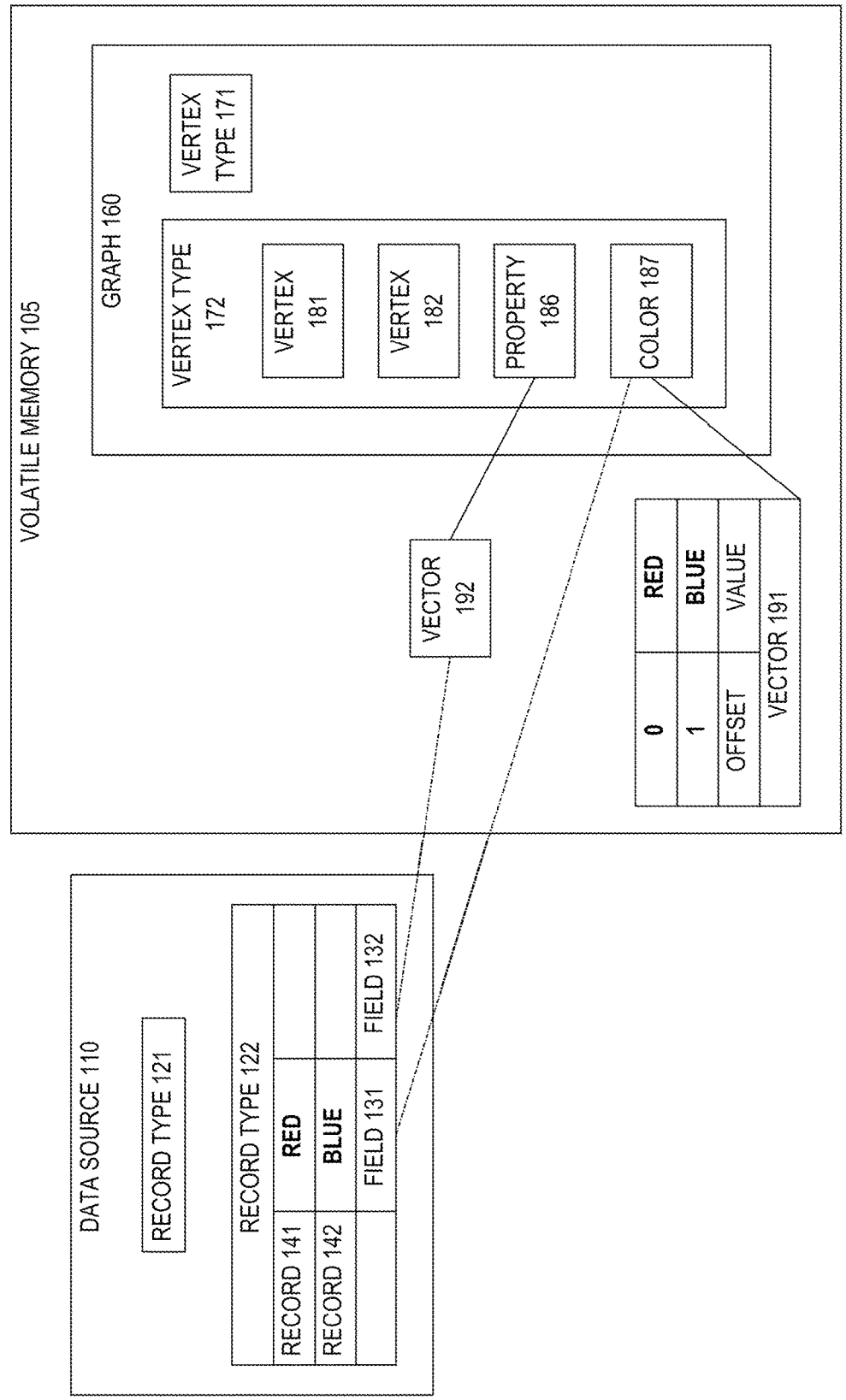
FIG. 1 is a block diagram that depicts an example computer that efficiently stores vertices of a heterogeneous graph in memory, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 Example Computer
    2.1 Data Source 2.2 Heterogeneous Graph
2.3 Random Access Memory
2.4 Vertex Properties
2.5 Vertex Encoding
3.0 Example Vertex Loading Process
4.0 Example Query Process
    4.1 Query Acceleration
    4.2 Improved Performance
5.0 Globally Unique Identifiers
    5.1 Ram Content
    5.2 Identifying Pair
6.0 Topology Encoding
    6.1 Relationships
    6.2 Foreign Key
    6.3 Endpoint Vectors
7.0 Example Topology Encoding Process
    7.1 Destination Vector
    7.2 Source Vector
    7.3 Performance Improvement
8.0 Edge Property Storage
9.0 Populating Edge Properties
10.0 Bidirectional Traversal
    10.1 Reverse Endpoint Vectors
11.0 Example Reverse Encoding Process
    11.1 Reverse Destination Vector
    11.2 Reverse Source Vector
    11.3 Edge Offset Translation
12.0 Undirected Arcs
    12.1 Arcs with Homogeneous Endpoints
13.0 Bidirectionally Encoding Arcs Having Homogeneous Endpoints
    13.1 Forward Encoding
    13.2 Backward Encoding
14.0 Hardware Overview
15.0 Software Overview
16.0 Cloud Computing

1.0 GENERAL OVERVIEW

Techniques are provided herein for efficient representation of heterogeneous graphs in memory. In an embodiment, vertices and edges of the graph are segregated by type. Each property of a type of vertex or edge has values stored in a respective vector. Directed or undirected edges of a same type are stored in compressed sparse row (CSR) format. The CSR format is more or less repeated for edge traversal in either forward or reverse direction. An edge map translates edge offsets obtained from traversal in the reverse direction for use with data structures that expect edge offsets in the forward direction. Subsequent filtration and/or traversal by type or property of vertex or edge entails minimal data access and maximal data locality, thereby increasing efficient use of the graph.

In an embodiment, a computer associates each vertex of a graph, which resides in memory, with a unique offset. For each relationship of a plurality of relationships in a data source, the following occurs. The relationship becomes associated with the following objects that reside in the memory: a distinct edge type in the graph for connecting a source vertex of a particular source vertex type with a destination vertex of a particular destination vertex type, a distinct source vector that is sorted, and a distinct destination vector that is sorted. For each instance of the relationship, a directed edge, which represents the instance of the relationship, is created, in the graph, as an instance of the distinct edge type of the relationship. The directed edge comprises a source vertex of the graph and a destination vertex of the graph. For each vertex of the particular source vertex type the following occurs. For each directed edge, of the distinct edge type, that has said vertex as its source vertex, the computer stores, into the distinct destination vector, the unique offset of the destination vertex of the directed edge. Into the distinct source vector, at the unique offset of said vertex, a last position, within the distinct destination vector, that contains a unique offset is stored. Subsequently, a reading of the graph is accelerated by accessing the distinct source vector of a relationship of a distinct edge type and/or the distinct destination vector of the relationship.

2.0 EXAMPLE COMPUTER

FIG. 1 is a block diagram that depicts an example computer 100, in an embodiment. Computer 100 efficiently stores vertices of a heterogeneous graph in memory. Computer 100 may be one or more computers such as an embedded computer, a personal computer, a rack server such as a blade, a mainframe, a virtual machine, or any computing device that uses scratch memory during symbolic processing.

Computer 100 may load and process graph 160, such as for querying, mutation, or analytics. Graph 160 is a logical graph of interconnected vertices, such as vertices 181-182. Vertices 181-182 may have properties, such 186-187, and graph 160 may be a property graph.

2.1 Data Source

Graph 160 is a logical view of underlying data that is provided by data source(s) such as 110. Data source 110 may be a durable data store, such as a relational database, a columnar database, a property store, a resource description framework (RDF) triplestore, a spreadsheet, a Hadoop file system (HDFS) file, or a data file. Data source 110 may spontaneously generate data, such as when data source 110 is a computer program, a web service, or a data feed such as a stream.

Data source 110 contains records, such as 141-142, that may be tuples, rows, or other structural units. Records 141-142 may aggregate data fields, such as 131-132, that store more or less atomic values. Data source 110 may have records, such as 141-142, of a same type, such as 122, or of different types such as 121-122. Record type 122 may have data fields 131-132, while record type 121 may have other data fields. In an embodiment, data source 110 is a relational database; record types 121-122 are tables in the relational database; records 141-142 are rows in a database table; and data fields 131-132 are columns in that database table.

As shown, graph 160 and data source 110 reside in a same computer 100. However, data source 110 may be remote (i.e. external to computer 100), such as residing in a cross mounted filesystem, network attached storage (NAS), a storage area network (SAN), or a remote service such as a relational database management system (RDBMS) accessed through open database connectivity (ODBC) or a web service accessed through hypertext transfer protocol (HTTP) according to simple object access protocol (SOAP), common gateway interface (CGI), and/or representational state transfer (REST). Data source 110 may serialize records 141-142 for consumption by computer 100 according to an encoding format such as extensible markup language (XML), JavaScript object notation (JSON), comma separated values (CSV), Java object serialization, or a proprietary/native binary format.

2.2 Heterogeneous Graph

Graph 160 is heterogeneous, which means that vertices, such as 181-182, may have a same type, such as 172, or different types such as 171-172. Computer 100 may have a mapping, such as marshalling or data binding logic, that causes subsets of vertex types 171-172 to be generated from subsets of record types 121-122. For example, one record type, such as 122, may map to one vertex type, 172. Other mappings are possible, such as one record type to many vertex types, many record types to one vertex type, or many to many.

2.3 Random Access Memory

Fast access to graph 160 may require low latency storage, such as random access memory (RAM), which may be volatile, such as 105, such as cheap and dense dynamic RAM (DRAM) or fast static RAM (SRAM). In an embodiment not shown, memory 105 is non-volatile (NVRAM), such as flash. Because RAM 105 typically has less capacity than disk storage due to capital cost, computer 100 uses a dense (i.e. space efficient) storage format for vertices 181-182.

2.4 Vertex Properties

The vertex storage format is columnar for vertex properties, such as 186-187, which are shredded (i.e. separated by property), such that each property is stored into a distinct property vector, such as 191-192. As shown, fields 131-132 respectively correspond to properties 186-187. Each of vertices 181-182 may have their own values for properties 186-187. For example, vertex 181 may have been generated from record 141 whose field 131 value is red. Thus, the value of color property 187 may be red for vertex 181. Likewise, vertex 182 may have a color 187 value of blue because record 142 has a value of blue for field 131. Thus, records of a same type have a same set of fields, and vertices of a same type have a same set of properties.

All of the values (e.g. red, blue) of color property 187 for vertices 181-182 of vertex type 172 are stored in property vector 191. Likewise, all of the values of property 186 are stored in vector 192. Some embodiments may have various ways of compressing vector 191, such as bit or byte packing (i.e. no padding for alignment), dictionary encoding, or run length encoding. Property vector storage may also accelerate processing, such as by reducing virtual memory swapping or by facilitating burst mode processing such as with single instruction multiple data (SIMD) and/or slicing register(s) (i.e. packing multiple values from vector 191 into a same central processing unit, CPU, register). Techniques for property vectors (a.k.a. column vectors) are detailed in U.S. Pat. No. 9,201,944, titled "Techniques For Maintaining Column Vectors Of Relational Data Within Volatile Memory," which is incorporated herein by reference.

2.5 Vertex Encoding

Each vertex of vertex type 172 may have a (e.g. zero based) distinct serial number. A sequence of serial numbers may be reused for different vertex types, so long as each serial number is unique within a given vertex type. For example, both of vertex types 171-172 may have its own vertex with a same serial number, such as zero. Although not shown, each of vertex types 171-172 may have an array of vertices of that type. The offset of a given vertex within that array may be used as the (e.g. implied) serial number of that vertex. For example, vertices 181-182 both are of vertex type 172 and may reside in a same vertex array at different offsets, such as zero and one respectively.

For demonstrative purposes, property vector 191 is shown as having two columns, offset and value. However, so long as property values are stored in property vectors 191-192 for vertices 181-182 in a same ordering as vertices 181-182 are stored in the vertex array (not shown) of vertex type 172, then the offset (e.g. serial number) of vertex 182 in the vertex array may be used for random access into property vectors 191-192 for vertex 182. Thus, the shown offset column of vector 191 may be an implied column that is not actually stored. Thus in an embodiment, the only data that vector 191 contains are values red and blue.

3.0 EXAMPLE VERTEX LOADING PROCESS

Figure 2:
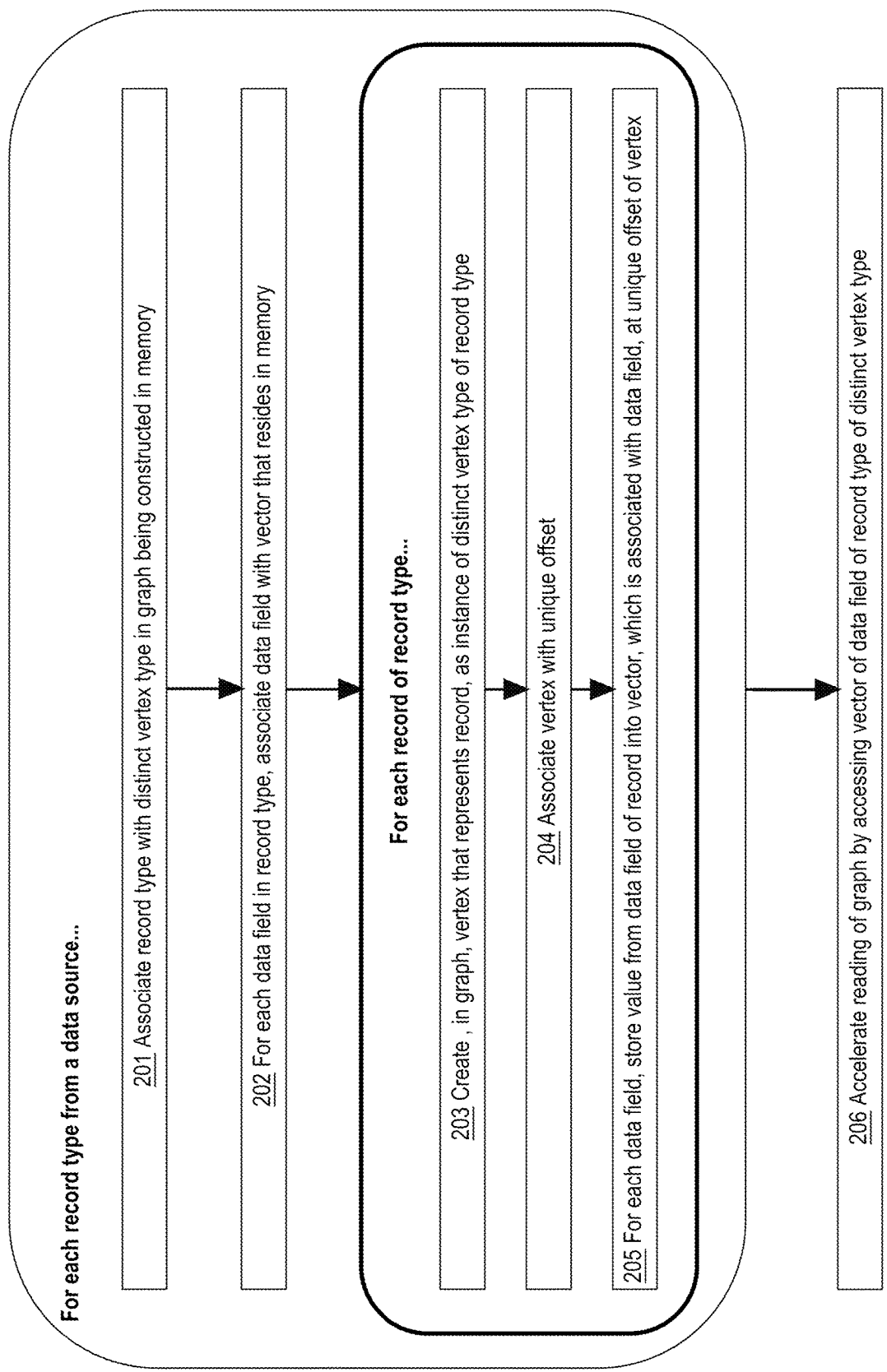
FIG. 2 is a flow diagram that depicts an example process for efficiently storing and using vertices of a heterogeneous graph in memory, in an embodiment.

FIG. 2 is a flow diagram that depicts computer 100 efficiently storing and using vertices of a heterogeneous graph in memory, in an embodiment. FIG. 2 is discussed with reference to FIG. 1.

The depicted process is performed by computer 100 in two phases, loading and use. During loading, the graph is created in memory based on data from data source(s). Loading occurs during steps 201-205, which are repeated for each record type provided by the data source(s) for the graph. Loading may be parallelized per data source or per record type.

Loading occurs in two phases, preparation and encoding. Preparation occurs during steps 201-202, during which empty data structures are created and linked within memory. Step 201 associates each record type with a distinct vertex type in a graph being constructed in memory.

In an embodiment, a static data binding mapping is consulted that indicates that record types 121-122 are respectively mapped to vertex types 171-172. In an embodiment without a static data binding, data source 110 may be interrogated and record types 121-122 may be discovered. From metadata about record types 121-122, vertex types 171-172 may be generated.

In an embodiment, a mapping of record types to vertex types need not be one-to-one. For example rows may be segregated, such as when record type 122 maps to both of vertex types 171-172 such that red records, such as 141, map to vertex type 171 and blue records, such as 142, map to vertex type 172. In another example fields may be separated, such as when field 131, color 187, and vertex type 172 are bound as shown, and although shown otherwise, field 132 and property 186 may be bound to vertex type 171. In another example, both of record types 121-122 map to vertex type 172.

Step 202 associates each data field in the record type with a vertex property vector that resides in memory. For example, a binding or inference may determine that data fields 131-132 map to vertex properties 186-187 as shown. Based on that information, empty vertex property vectors 191-192 are created.

Vertex encoding occurs during steps 203-205, which are repeated for each record of the record type. A vertex or subset of vertices may be a unit of parallelism during encoding. Each repetition of steps 203-205 populates one vertex. In an embodiment, empty graph 160 is created in step 201 or 202, and vertices may be added to graph 160 as each vertex is initialized. In an embodiment, empty graph 160 is not created until later, but not later than immediately after step 205, and no vertices are added to graph 160 until all vertices are initialized.

Step 203 creates a vertex, having a vertex type, from a record having a record type that corresponds to the vertex type. For example, vertex 181 is created from record 141.

Step 204 assigns a unique offset integer to the vertex. For example, vertex 181 may be stored into a vertex array (not shown) in memory at a distinct offset within the array. That offset may be used to identify the vertex as distinct in that vertex type, although not necessarily distinct across multiple vertex types. Globally unique identifiers are discussed later herein.

Step 205 stores vertex properties. A value from each data field of the record is stored into a distinct vertex property vector associated with that field. Values are stored into property vectors at a same offset as was assigned to the vertex in step 204. For example, the value blue is copied from field 131 of record 142 into color property 187 of vertex 182, which is stored at offset one within vector 191.

After step 205, graph loading is finished, and graph 160 is ready to use. In an embodiment, graph 160 is made read only after step 205.

Graph use occurs during step 206. For example, a property of a vertex may be read. That read is accelerated due to the streamlined storage format as described above. Both of random access of a property for one vertex or scanning the property for many vertices are accelerated. For example, computer 100 may receive and execute a query for graph 160 to find individual vertices or multi-vertex paths or subgraphs based on vertex properties. Query processing is further discussed in FIG. 3.

4.0 EXAMPLE QUERY PROCESS

Figure 3:
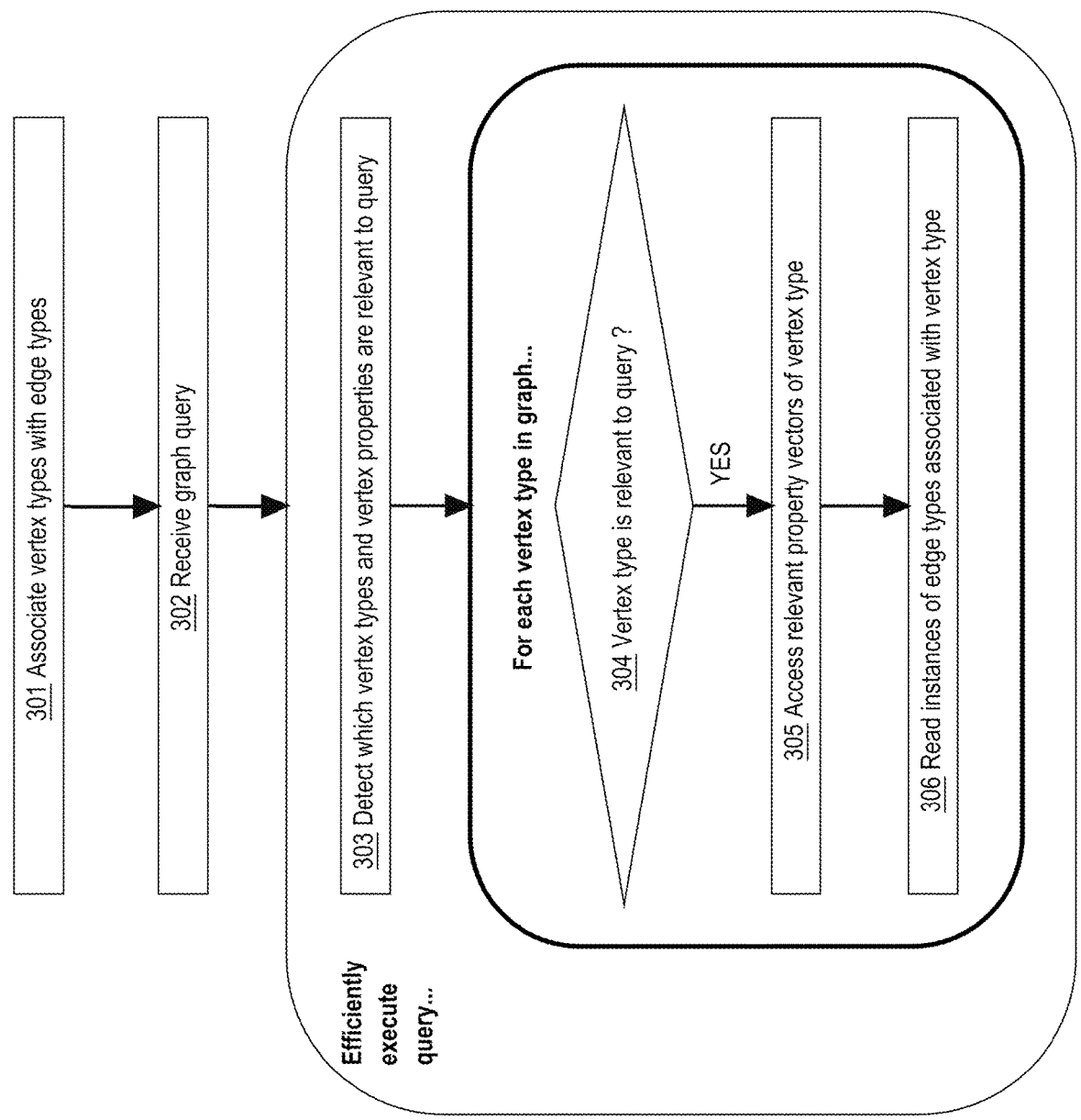
FIG. 3 is a flow diagram that depicts an example process for efficiently executing a query of a heterogeneous graph in memory, in an embodiment.

FIG. 3 is a flow diagram that depicts computer 100 efficiently executing a query of a heterogeneous graph in memory, in an embodiment. FIG. 3 is discussed with reference to FIGS. 1-2.

In this example, query execution entails graph navigation, which entails repeated traversal from one vertex to another along an edge. Like vertices, edges may have types. Each edge connects two vertices, or one vertex to itself. Like vertices, edges may have types, properties, and property vectors with offsets aligned to an edge vector of an edge type. Edge storage and use are discussed later herein.

Step 301 is preparatory. Step 301 presumes a graph loaded in memory per FIGS. 1-2. Step 301 furthers the graph loading of steps 201-202 of FIG. 2.

Step 301 associate vertex types with edge types and loads edges. Graph traversal depends on graph topology because graph traversal occurs outwards through edges of a vertex. Thus, step 301 establishes which edge type (and edges) are available when traversing from a given vertex.

Steps 302-306 may occur during step 206 of FIG. 2. In step 302 a graph query is received. The query may be expressed in a graph language, such as Sparql, or another language such as standard query language (SQL), extensible markup language path (XPath), query by example (QBE), regular expression, or domain (e.g. graph) specific language (DSL). The query may mention types and properties of vertices and edges of graph 160, constants (i.e. literals), and operators. The query may specify filtration, navigation, and projection.

4.1 Query Acceleration

Efficient execution of the query occurs during steps 303-306. Step 303 detects which types and properties of vertices (and edges) are relevant to the query. Step 303 may construct and semantically analyze a parse tree (AST) of the query. At a minimum, types and properties of vertices and edges are relevant if recited in the query (and/or appear in the AST).

Steps 304-306 are repeated for each vertex type. Step 304 detects whether or not the vertex type participates in the query. Steps 303-304 may contribute to formulating a query execution plan.

According to step 304, irrelevant vertex types are skipped, which is efficient. In an embodiment that lazily loads vertices and/or vertex types, skipping may mean deferring or avoiding loading some vertices. Likewise, vertex properties may be individually irrelevant, skipped, and not loaded. For example, a first query of a cold (i.e. incompletely loaded) graph may cause vertex property vector 191 to be loaded, but not vector 192, because only color 187 is accessed by the query, and not property 186.

Step 305 accesses relevant property vectors of the vertex type. Step 305 may entail random access to properties of particular vertices or scanning of properties of many vertices. For example, multiple values contiguously stored in vertex property vector 191 may be simultaneously loaded (e.g. packed) into a same CPU register and/or processed together by single instruction multiple data (SIMD) or other vector hardware acceleration, such as with a graphics processing unit (GPU).

4.2 Improved Performance

Thus, efficiencies of space savings and acceleration arise at two levels. First, heterogeneity of vertex types facilitates minimizing how many vertices are accessed by the query or even loaded. Second, column (i.e. property) shredding and storage in separate vectors facilitates both of: a) minimizing how many property values are accessed by the query or even loaded, b) property vector compression such as by dictionary or run-length encoding, which may occur during or after loading a property vector, and c) vector data parallelism such as by SIMD or GPU.

These many efficiencies are more or less unavailable with graph loading techniques that treat vertices and edges as homogeneous or generalized. Various space savings (e.g. loading avoidance, reading avoidance, vector packing and/or other vector compression) may cause various levels of acceleration such as decreased virtual memory thrashing, increased hardware cache locality, decreased bus saturation or wait states, and hardware data parallelism.

Edge traversal occurs during step 306, which inspects edges of vertex(ices) to steer along a path or prune a subgraph. Step 306 may facilitate exploration algorithms such as breadth first search (BFS) or depth first search (DFS), because edge traversal facilitates iteration of neighboring vertices. Edge storage and access techniques are discussed later herein.

5.0 GLOBALLY UNIQUE IDENTIFIERS

Figure 4:
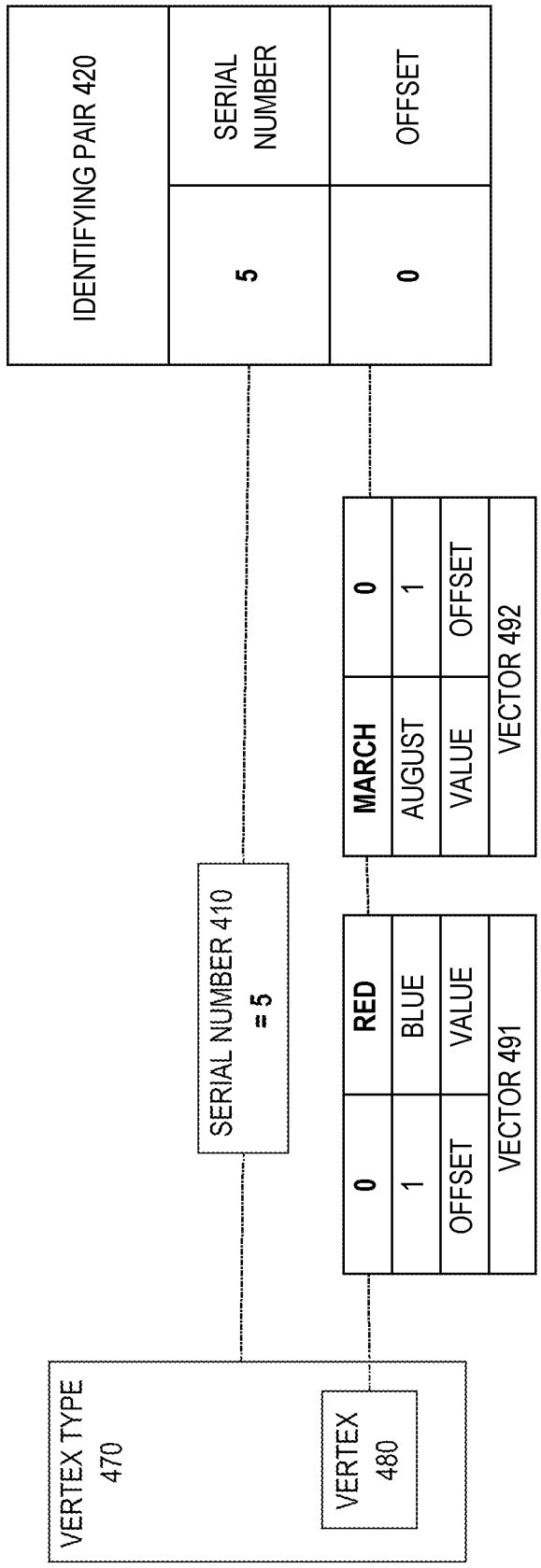
FIG. 4 is a block diagram that depicts an example random access memory (RAM) of a computer that generates an identifier, which is compact and globally unique, for each vertex, regardless of type, in a graph, in an embodiment.

FIG. 4 is a block diagram that depicts an example random access memory (RAM) 405 of a computer (not shown), in an embodiment. As discussed for FIG. 1, vertices of a same type may be identified by their offset into a vertex array of that type, and a sequence of offsets may collide (i.e. be reused) for other vertex types. Whereas, this computer generates an identifier, which is compact and globally unique, for each vertex, regardless of type, in a graph. This computer may be an implementation of computer 100.

5.1 Ram Content

RAM 405 stores a heterogeneous graph (not shown) that includes vertex type 470, which may have vertices, such as 480, and various vertex properties that may each be stored in a property vector such as 491-492. Each of vectors 491-492 store property values of multiple vertices. The contents of vectors 491-492 have a same ordering by vertex as does the vertex array (not shown) of vertex type 470. For example, vertex 480 may be a first vertex (i.e. offset zero) in the vertex array. Thus, the top row (i.e. offset zero) of vectors 491-492 have property values for vertex 480.

5.2 Identifying Pair

Thus, a zero is recorded in the offset field within identifying pair 420. Identifying pair 420 uniquely and globally identifies vertex 480. However, a vertex offset is insufficient to uniquely and globally identify a vertex. Thus, identifying pair 420 also has an additional field to ensure global uniqueness. The additional field should identify which type is vertex 480. In an embodiment, the additional field records the name of vertex type 470. In an embodiment, the additional field is a serial number that uniquely identifies vertex type 470. Vertex type 470 has serial number 410 with a value of five, which is recorded in the identifying pairs of vertices such as 480.

The serial number and offset fields of identifying pair 420 may be integers. The serial number need not have a same width (i.e. storage size) as the offset, and they may be byte packed or bit packed together, such that the width of identifying pair 420 comprises the sum of the widths of the serial number and offset fields. For speed, the width of identifying pair 420 should not exceed a machine word (e.g. CPU register width), which usually is 64 bits. A graph with too many vertices may need as many as 128 bits (i.e. double word) for identifying pair 420.

A more or less same technique may be used to globally identify edges that connect vertices. RAM storage of edges is discussed later herein. Besides FIG. 4, the other figures herein depict techniques that are designed for vertex and edge identifiers that are unique only within a vertex type or edge type. Globally unique identifiers, per FIG. 4, may facilitate filtration by type, because the type of vertex or edge is encoded (e.g. serial number) into identifying pair 420. Globally unique identifiers may also be interesting to client applications or ad hoc clients.

6.0 TOPOLOGY ENCODING

Figure 5:
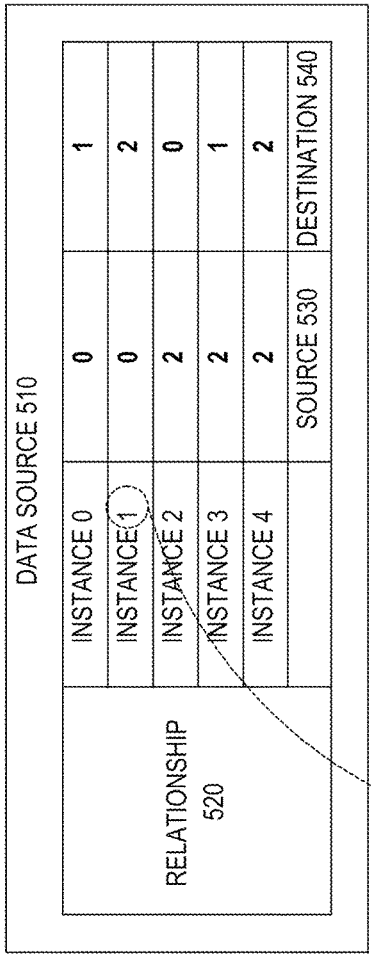
FIG. 5 is a block diagram that depicts an example computer that encodes directed edges of a heterogeneous graph in compressed sparse row (CSR) format for space efficiency and accelerated access, in an embodiment.
Figure 5:
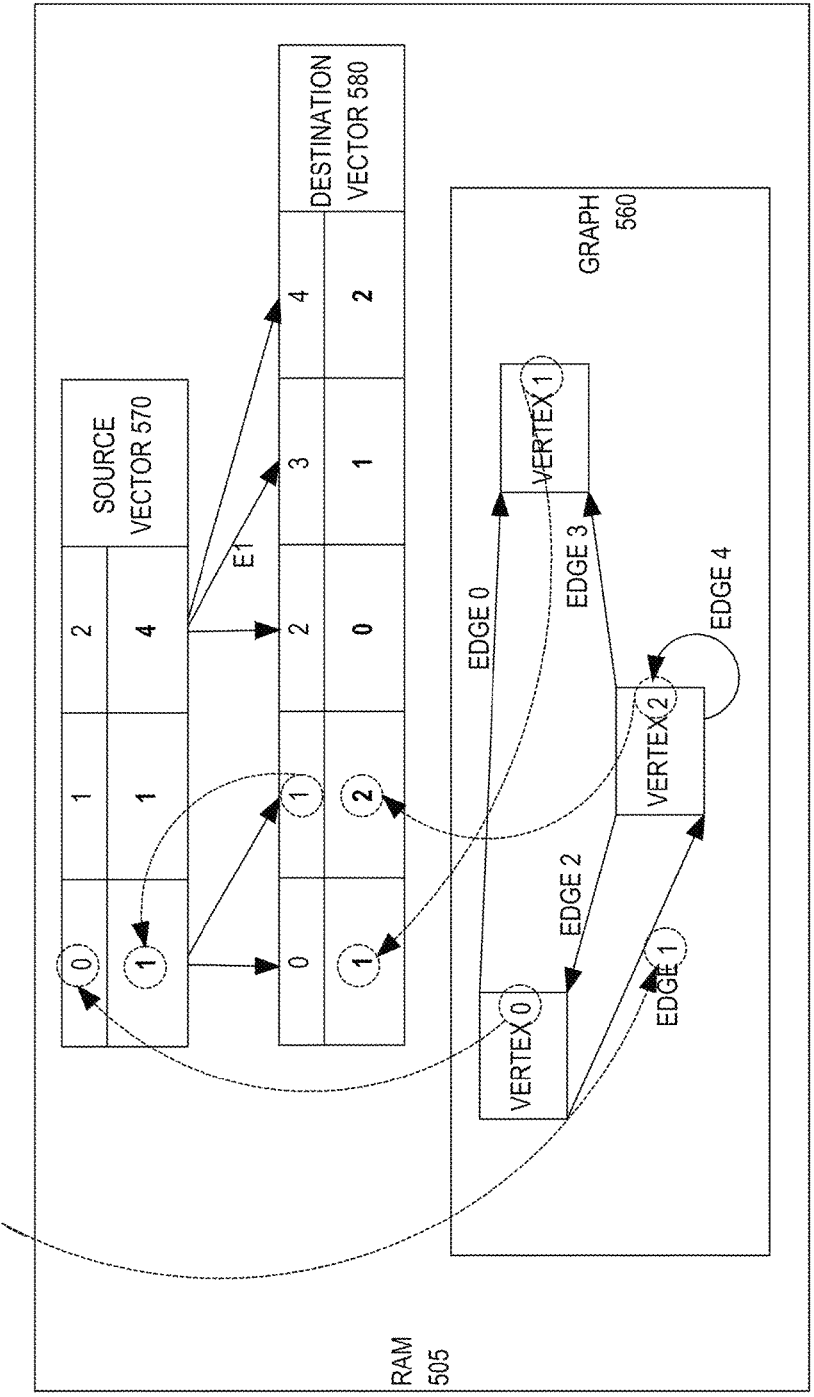

FIG. 5 is a block diagram that depicts an example computer 500, in an embodiment. Computer 500 encodes directed edges of a heterogeneous graph in compressed sparse row (CSR) format for space efficiency and accelerated access. Computer 500 may be an implementation of computer 100.

6.1 Relationships

Computer 500 loads graph 560 into RAM 505 based on data from data source 510 as follows. In addition to providing records (not shown) for vertices 0-2, data source 510 also provides relationship 520 for creating edges 0-4. Each instance 0-4 of relationship 520 provides data for respective edges 0-4. For example as shown, edge 1 is generated from instance 1.

For demonstration, relationship 520 is depicted as tabular. Each row represents one instance of relationship 520. Relationship 520 has columns 530 and 540 that identify the directed endpoint vertices of each instance. For example, instances 1-2 are edges in opposite directions between a same two vertices. Instance 4 is reflexive (i.e. connects a vertex to itself).

In an embodiment, data source 520 is a relational database. Relationship 520 may be encoded within a relational database table in various ways based on one or two foreign keys in one or three tables as follows. Each of instance 0-4 connects (i.e. joins) two tables.

6.2 Foreign Key

For example, columns 530 and 540 may identify rows of respective source and destination tables (not shown). Source 530 may be a primary key column within the source table. Destination 540 may be replicated as two columns: a) a primary key column in the destination table, and b) a foreign key column in the source table. This may achieve a one-to-one or one-to-many relationship. In another example, source 530 may instead be the replicated column, and the destination table may store the foreign key column. When the source and destination tables are a same table, then reflexivity such as with instance 4 is possible.

Another example may involve a third table as an associative table. For example relationship 520 may be an associative table that is separate from the source and destination tables. As such, both of columns 530 and 540 are foreign keys that cross reference the source and destination tables respectively. This may achieve a one-to-one, one-to-many, or many-to-many relationship. Regardless of how many tables and keys are used for relationship 520, the instance column might be implied (i.e. demonstrative and not actually stored).

6.3 Endpoint Vectors

Edges 0-4 are created from instances 0-4 by populating edge endpoint vectors 570 and 580 and a set of property vectors (not shown). Edge property vectors are encoded in a similar way to vertex property vectors, as described above. For example, there may be an array (not shown) of edges for each type of edge. The contents of edge property vectors may share the edge array's ordering of edges.

Edge endpoint vectors 570 and 580 are encoded based on a special ordering of edges as follows. The special ordering of edges 0-4 depends on the ordering of vertices 0-2 in the vertex array (not shown). The following discussion of FIGS. 5-6 describes how to populate edge endpoint vectors 570 and 580 according to the special ordering of edges 0-4.

7.0 EXAMPLE TOPOLOGY ENCODING PROCESS

Figure 6:
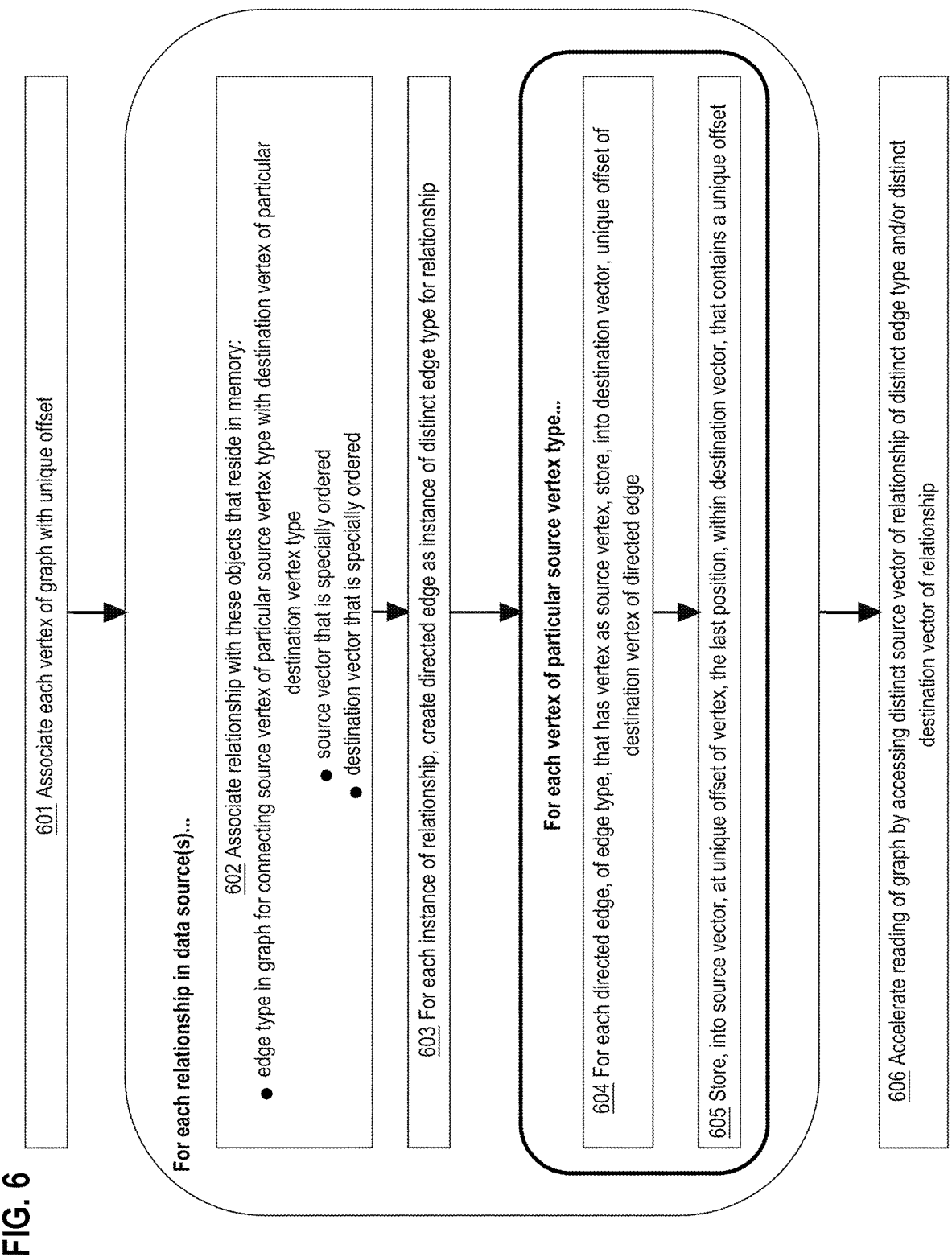
FIG. 6 is a flow diagram that depicts an example process for encoding directed edges of a graph in CSR format for space efficiency and accelerated access, in an embodiment.

FIG. 6 is a flow diagram that depicts computer 100 encoding directed edges of a graph in compressed sparse row (CSR) format for space efficiency and accelerated access, in an embodiment. FIG. 6 is discussed with reference to FIG. 5.

The depicted process is performed by computer 500 in two phases, loading and use. During loading, the graph is created in memory based on data from data source(s). Loading occurs during steps 601-605, which are repeated for each relationship provided by the data source(s) for the graph. Loading may be parallelized per data source or per relationship.

Loading occurs in two phases, preparation and encoding. Preparation occurs during steps 601-602, during which empty data structures are created and linked within memory. Step 601 associates each vertex of a graph with an offset that is unique to the type of vertex, although not necessarily globally unique. In an embodiment, RAM 505 is an implementation of memory 105 of FIG. 1, with vertices already loaded according to FIG. 2. In an embodiment, vertices of a same type may be stored at their unique offsets within a vertex array (not shown).

Steps 602-605 are repeated for each relationship in data source(s). With the relationship, step 602 associates a distinct edge type that connects a source vertex type to a destination vertex type, which need not be a same vertex type. Also with the relationship, step 602 associates a source vector and a destination vector. For example for an edge type associated with relationship 520, endpoint vectors 570 and 580 are created. Vectors 570 and 580 are initially empty. Subsequent steps populate vectors 570-580 according to special orderings. In that sense, contents of vectors 570 and 580 are effectively sorted, without actually invoking a sorting algorithm.

Edge encoding occurs during steps 603-605. Step 603 is repeated for each instance of the relationship. Each repetition of step 603 may populate one edge's properties within edge property vectors (not shown). In an embodiment, empty graph 560 is created in step 601, and edges may be added to graph 560 as each edge is initialized. In an embodiment, empty graph 560 is not created until later, but not later than immediately after step 605, and no edges are added to graph 560 until all edges are initialized.

Step 603 creates an edge, having an edge type, from an instance of the relationship that corresponds to the edge type. For example, edge 1 is created from instance 1. In an embodiment, the edge is stored in an array for that edge type.

7.1 Destination Vector

Edge encoding and special ordering within vectors 570 and 580 are achieved by steps 604-605 as follows. Steps 604-605 are repeated for each vertex of the source vertex type. Step 604 is repeated for each edge of the edge type that has that vertex as a source vertex. In other words, step 604 is repeated for each edge of the edge type that originates from that vertex.

For example, vertex 0 is the source vertex of edges 0-1, which are of a same edge type. Although edge 2 has the same edge type and also connects to vertex 0, the source vertex of edge 2 is not vertex 0. Edge 0 connects source vertex 0 to destination vertex 1.

Into the next sequential (i.e. vacant) position within the destination vector of the edge type, step 604 stores the value of the offset that was assigned to the destination vertex in step 601. For example, vertex 1 is stored at zero-based offset one of a vertex array (not shown) of a vertex type. For edge 0, step 604 appends a one to empty destination vector 580. Because destination vector 580 is empty, the one is appended (i.e. stored) at position zero of destination vector 580. Also from same source vertex 0 as edge 0, is edge 1 that has vertex 2 as its destination vertex, a two is appended to the next position of destination vector 580, which is at zero-based offset 1.

Thus edges, of the edge type, from a same source vertex are contiguously recorded in destination vector 580, after which, step 604 repeats for a next vertex of the same source vertex type. The next source vertex may arise during a sequential iteration of the vertex array (not shown) of that vertex type. Thus, the contents of destination vector 580 are implicitly sorted by source vertex.

7.2 Source Vector

Step 605 stores, into the source vector of the edge type, at the same offset as was assigned to the source vertex in step 601, the last position, within the destination vector, that contains a unique offset of a destination vertex of a directed edge that has the vertex as source vertex. That last position should be the last position that was written to in step 604. For example for source vertex 0, positions 0-1 were written to within destination vector 580, with 1 being the last position written. Thus, step 605 stores a 1 into source vector 570 at the same offset as was assigned to vertex 0, which is offset 0.

Whereas next vertex 1 of the source vertex type is not a source vertex for any edge of the edge type. In other words, no edge of the edge type originates from vertex 1. Thus, step 604 records nothing into destination vector 580 for vertex 1. Thus, the last written position within destination vector 580 is the same for vertices 0-1. Thus, step 605 writes the same value 1 into source vector 570, but at the offset assigned to vertex 1, which is 1.

After step 605, population of endpoint vectors 570 and 580 is finished. Source vector 570 has as many values as there are vertices of the source vertex type of the edge type. By design and without further sorting, values within source vector 570 are ordered by source vertex and are monotonically increasing.

7.3 Performance Improvement

Destination vector 580 has as many values as there are edges of the edge type. By design and without further sorting, values within destination vector 580 too are ordered by source vertex. However, those values (e.g. 1, 2, 0, 1, 2 as shown) are clearly not naturally sorted. As shown, edges are recorded within destination vector 580 in their natural ordering of 0-4. The efficiency of these special orderings of the contents of endpoint vectors 570 and 580 manifests in step 606 as follows.

Graph use occurs during step 606. For example, an edge may be traversed. That traversal is accelerated due to the streamlined storage format as described above. Both of random access for traversal of one edge, such as for probing during a depth first search, or traversal of many edges, such as for reaching neighboring vertices during a breadth first search, are accelerated. For example, computer 500 may receive and execute a query for graph 560 to find multi-edge paths or subgraphs based on types and properties of edges and neighboring vertices.

For example, source vertex 2 originates edges 2-4. Endpoint vectors 570 and 580 may be used for fast traversal of those edges during step 606 as follows. The offset assigned to vertex 2 during step 601 is 2. At offset 2 within source vector 570 is value 4, with a preceding value of 1 at offset 1 within source vector 570. Four minus one is three. Thus, vertex 2 originates three directed edges, which are recorded within destination vector 580 after (i.e. excluding) offset 1 and until (i.e. including) offset 4, because values 1 and 4 are contiguously stored in source vector 570. One exclusive through four inclusive is the same as two inclusive through four. Thus, the three edges originating from vertex 2 are recorded within destination vector 580 at offsets 2-4, which stores values 0, 1, 2, which are the identifying offsets that were assigned to destination vertices 0-2 in step 601. Thus, destination vertices 0-2 are immediate neighbors of source vertex 2 by way of edges of the given edge type.

Because each edge type has its own source vector and destination vector, filtration and/or traversal by edge type entails minimal data access and maximal data locality, thereby increasing efficient reading of graph 560. Edge properties stored in property vectors may efficiently be randomly or sequentially accessed during edge traversal or iteration if the property vectors have an edge ordering that matches the ordering of destination vector 580.

Endpoint vectors 570 and 580 together achieve compressed sparse row (CSR) encoding of graph 560's topology (i.e. edges), which is space and time efficient for traversal and filtration of edges. In an embodiment, vertex offsets recorded in endpoint vector 570 and/or 580 are bit or byte packed (i.e. not byte aligned or not word aligned, respectively for increased density). However, CSR may be inefficient to adjust, such as when graph 560's topology evolves by addition or removal of an edge. Thus, endpoint vectors 570 and 580 may become read only in an embodiment. While read only endpoint vectors may more or less prevent topological mutation, edge property vectors may still be writable, such that edge property values may change. For example, a value of a weight property of an edge may change, even if the edge cannot be removed. For example, removal of an edge may be approximated by setting its weight property to zero or setting its deletion flag property to true. Edge property vectors are discussed further in FIG. 7.

8.0 EDGE PROPERTY STORAGE

Figure 7:
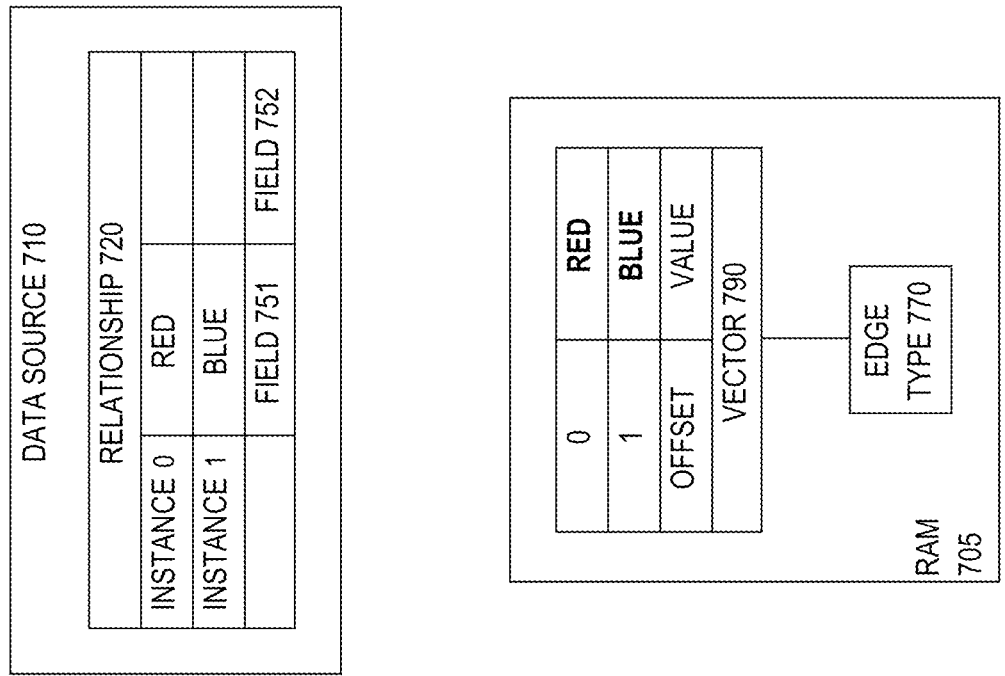
FIG. 7 is a block diagram that depicts an example computer that populates edge property vectors for space efficiency and accelerated access, in an embodiment.

FIG. 7 is a block diagram that depicts an example computer 700, in an embodiment. Computer 700 populates edge property vectors for space efficiency and accelerated access. Computer 700 may be an implementation of computer 100.

Computer 700 populates edge property vector 790 within RAM 705 based on data from instances 0-1 of data source 710 as follows. Data source 710 provides relationship 720 that includes data fields 751-752. A separate edge of type 770 may be created for each of instances 0-1 to populate an edge table (not shown) of edge type 770. Values within field 751 of instances 0-1 are copied into vector 790 at offsets 0-1 according to a same edge ordering as the edge table, which facilitates random access into vector 790 for a given edge. The offset column of vector 790 may be implied (i.e. demonstrative and not stored). Thus, edge property vector 790 need only store values red and blue, perhaps without any metadata. Edge loading is further discussed in FIG. 8.

9.0 POPULATING EDGE PROPERTIES

Figure 8:
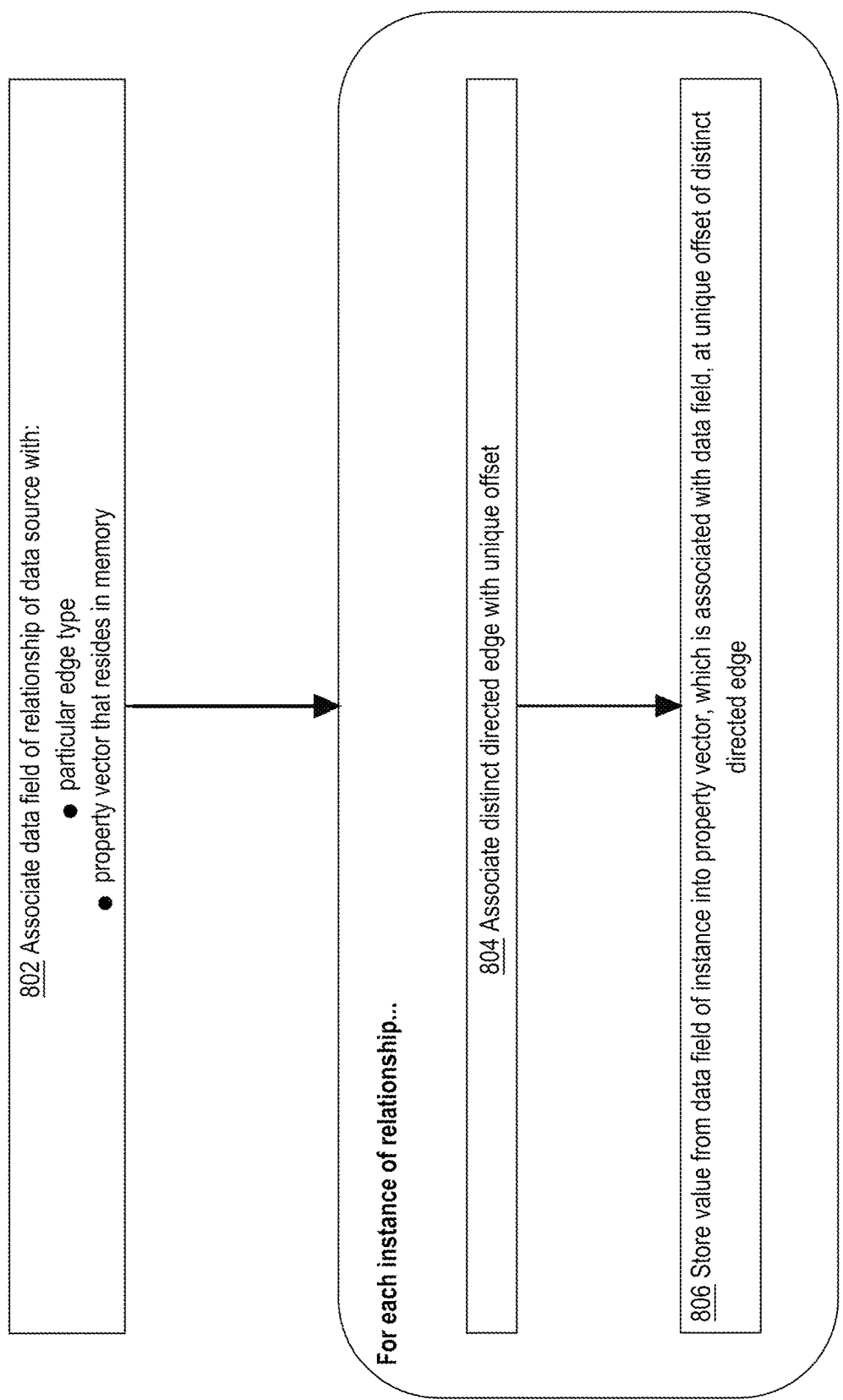
FIG. 8 is a flow diagram that depicts an example process for populating edge property vectors for space efficiency and accelerated access, in an embodiment.

FIG. 8 is a flow diagram that depicts computer 700 populating edge property vectors for space efficiency and accelerated access, in an embodiment. FIG. 8 is discussed with reference to FIG. 7. Steps 802, 804, and 806 load one property of one edge type into a property vector. This process may be (e.g. concurrently) repeated with other property vectors for additional properties of that edge type and for additional edge types.

Step 802 associates a data field of a relationship of a data source with an edge type and a property vector. For example, edge type 770 may become associated with empty property vector 790 and data field 751.

Steps 804 and 806 are repeated for each instance, such as 0-1 of FIG. 7, of the relationship. A prerequisite of step 804 is that at least step 603 of FIG. 6 is done. In an embodiment, all graph (i.e. vertex and edge) loading of FIGS. 5-6 occurs before step 804. Thus, edges (not shown) are loaded (e.g. into an edge array of the edge type) from instances 0-1 before step 804.

Step 804 associates the edge with an offset that is unique for the edge type, though not necessarily across all edge types. For example, the edges are stored into an edge array (not shown) at their offsets.

Step 806 copies a value of a data field of the relationship instance into a property vector, which is associated with the data field, at the offset assigned to the edge. For example, a red value is copied from data field 751 of instance 0 into edge property vector 790 at offset 0 because 0 is the offset assigned to the edge (not shown) generated from instance 0. For example, that edge is the first edge in the zero-based edge array of edge type 770.

10.0 BIDIRECTIONAL TRAVERSAL

Figure 9:
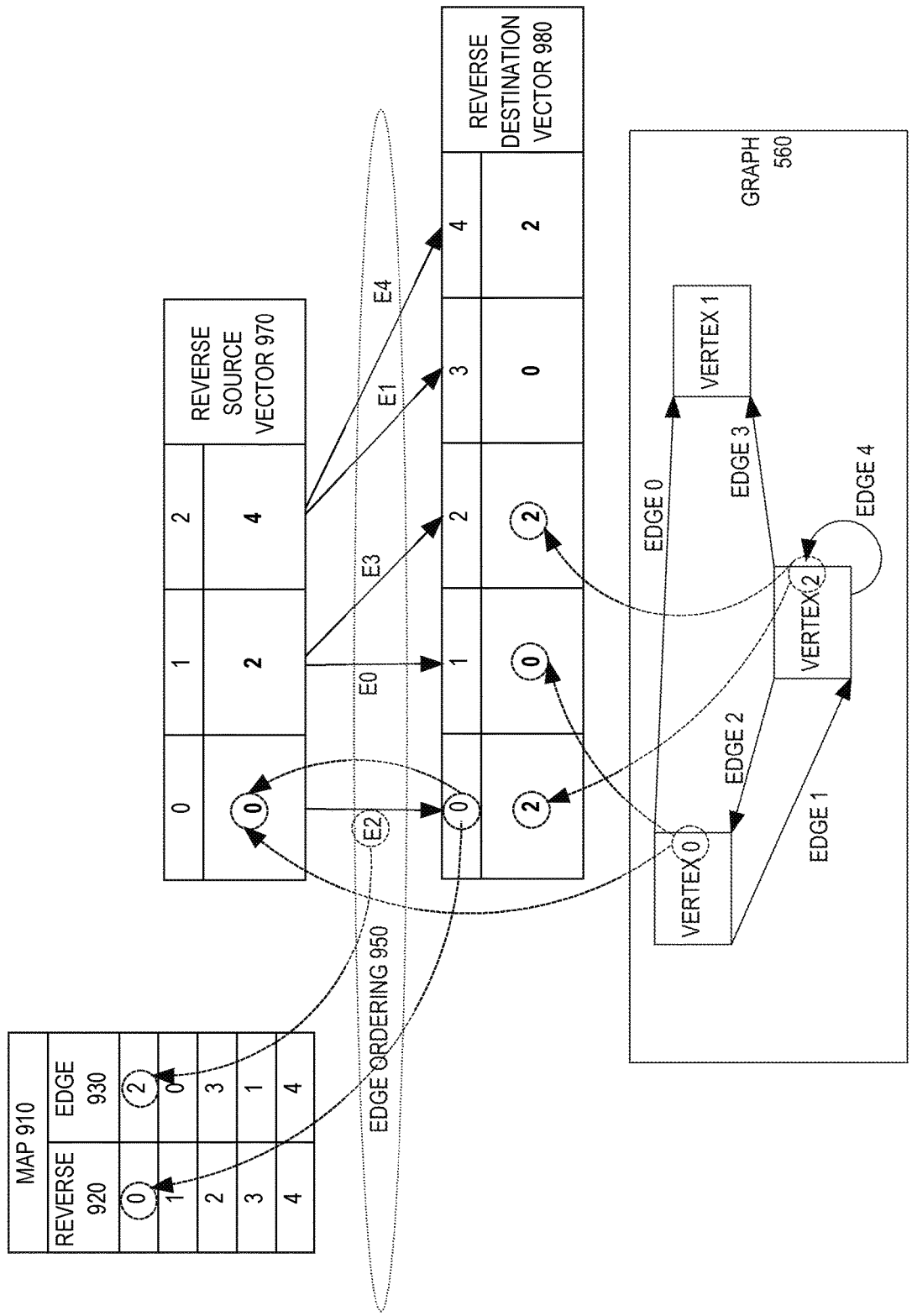
FIG. 9 is a block diagram that depicts an example RAM that contains edge endpoint vectors that are optimized for accessing directed edges according to their source vertices, such as when edges are naturally traversed in the direction of each edge, in an embodiment.

FIG. 9 is a block diagram that again depicts example RAM 505 of FIG. 5, in an embodiment. FIG. 5 depicts edge endpoint vectors 570 and 580 that are optimized for accessing directed edges 0-4 according to their source vertices, such as when edges are naturally traversed in the direction of each edge. Access of directed edges from their destination vertices is against the direction of the edges and requires additional data structures 910, 970, and 980 for efficiently accessing of edges in the opposite (i.e. reverse) direction. The combination of FIGS. 5 and 9 achieve seamless (i.e. efficient) edge access, regardless of edge direction. FIG. 9 presumes RAM 505 is already populated per FIG. 5. Graph 560 is unchanged from FIG. 5.

10.1 Reverse Endpoint Vectors

Reverse endpoint vectors 970 and 980 are analogous to direct endpoint vectors 570 and 580 (not shown in FIG. 9), except that the semantics of endpoints are reversed as if the edges were reversed. For example, identifiers of source vertices are recorded in reverse destination vector 980, whereas direct destination vector 580 records identifiers of destination vertices. Likewise, the offsets into reverse source vector 970 correspond to destination vertices, whereas offsets into direct source vector 570 correspond to source vertices.

Population of reverse data structures 910, 970, and 980 are described later herein for FIGS. 9-10. However, a consequence of reverse population is that reverse destination vector 980 has an ordering of edges that is different (and not merely the reverse, which may be counterintuitive) of the ordering of edges in direct destination vector 580. Because direct destination vector 580 has a same edge ordering as an edge array (not shown) and edge property vectors (not shown), that means that reverse destination vector 980 has an edge ordering that is incompatible with the edge array and the edge property vectors. Thus, access to edges (e.g. edge properties) through reverse destination vector 980 may require translation of edge offsets from the reverse ordering to the direct ordering. Map 910 achieves that translation and is discussed with FIGS. 9-10 as follows.

11.0 EXAMPLE REVERSE ENCODING PROCESS

Figure 10:
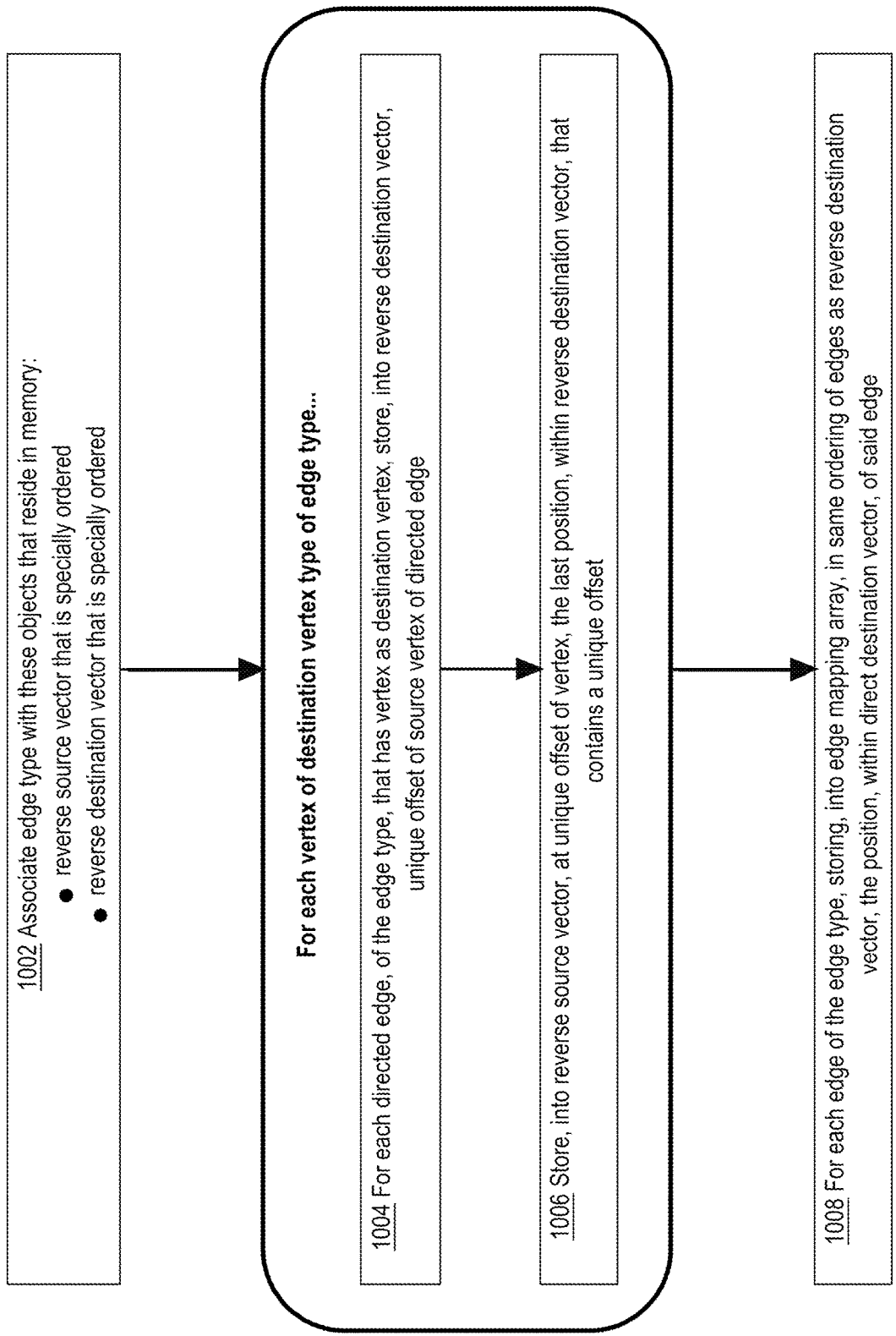
FIG. 10 is a flow diagram that depicts an example process for encoding directed edges of a graph in CSR format for space efficiency and accelerated backward (i.e. the opposite of a directed edge's natural direction) traversal, in an embodiment.

FIG. 10 is a flow diagram that depicts computer 500 encoding directed edges of a graph in compressed sparse row (CSR) format for space efficiency and accelerated backward (i.e. the opposite of a directed edge's natural direction) traversal, in an embodiment. FIG. 10 is discussed with reference to FIGS. 5 and 9. The process depicted in FIG. 10 reverse encodes edges of one edge type and may be repeated for each additional edge type.

Step 1002 associates the edge type with a distinct reverse source vector and a distinct reverse destination vector. For example, empty reverse endpoint vectors 970 and 980 are created within RAM 505.

Steps 1004 and 1006 are repeated for each vertex, such as 0-2, of the source vertex type of the edge type. A prerequisite of step 1004 is that at least step 603 of FIG. 6 is done. In an embodiment, all graph (i.e. vertex and edge) loading of FIGS. 5-6 occurs before step 1004. Thus, edges 0-4 are loaded (e.g. into the edge array of the edge type) before step 1004.

Edge reverse encoding and special ordering within vectors 970 and 980 are achieved by steps 1004 and 1006 as follows. Steps 1004 and 1006 are repeated for each vertex of the destination vertex type of the edge type. Step 1004 is repeated for each edge of the edge type that has that vertex as a source vertex. In other words, step 1004 is repeated for each edge of the edge type that terminates at that vertex.

For example, vertex 0 is the destination vertex of edge 2. Although edges 0-1 have the same edge type and also connect to vertex 0, the destination vertex of edges 0-1 are not vertex 0. Edge 2 connects destination vertex 0 to source vertex 2.

11.1 Reverse Destination Vector

Into the next sequential (i.e. vacant) position within the reverse destination vector of the edge type, step 1004 stores the value of the offset that was assigned to the source vertex in step 601 of FIG. 6. For example, vertex 2 is stored at zero-based offset 2 of a vertex array (not shown) of a vertex type. For edge 4, step 1004 appends a two to empty reverse destination vector 980. Because reverse destination vector 980 is empty, the value 2 is appended (i.e. stored) at position zero of reverse destination vector 980.

Edges, of the edge type, to a same destination vertex are contiguously recorded in reverse destination vector 980, after which, step 1004 repeats for a next vertex of the same destination vertex type. The next destination vertex may arise during a sequential iteration of the vertex array (not shown) of that vertex type. Thus, the contents of reverse destination vector 980 are implicitly sorted by destination vertex.

11.2 Reverse Source Vector

Step 1006 stores, into the reverse source vector of the edge type, at the same offset as was assigned to the destination vertex in step 601 of FIG. 6, the last position, within the reverse destination vector, that contains a unique offset of a source vertex of a directed edge that has the vertex as destination vertex. That last position should be the last position that was written to in step 1004. For example for destination vertex 0, only position 0 was written to within reverse destination vector 980, with 0 being the last position written. Thus, step 1006 stores a 0 into reverse source vector 970 at the same offset as was assigned to vertex 0, which is offset 0.

After step 1006, population of reverse endpoint vectors 970 and 980 is finished. Reverse source vector 970 has as many values as there are vertices of the destination vertex type of the edge type. By design and without further sorting, values within reverse source vector 570 are ordered by destination vertex and are monotonically increasing.

11.3 Edge Offset Translation

As explained for FIG. 6, edge iteration and edge property filtration may share same edge indices and occur in a single pass, thereby accelerating a query that traverses edges in their natural direction, as with direct destination vector 580. However, edge ordering 950 is different from the edge ordering of direct destination vector 680 and the edge property arrays of the edge type. Offset translation map 910 is needed to take offset positions 0-4 of reverse destination vector 980 and convert them to assigned edge indices for use with an edge array and edge property vectors for the edge type.

In an embodiment that lacks map 910, step 1008 is not performed. Step 1008 creates and populates offset translation map 910. For each edge of the edge type, step 1008 stores into an edge mapping array, in a same ordering of edges as the reverse destination vector, the position, within the direct destination vector, of the edge. For example, edge 2 is the first/only edge, of the edge type, that has vertex 0 as its destination vertex. Edge 2 has vertex 2 as its source vertex. Thus, two is recorded into offset 0 of reverse destination vector 980. The offset 0 may be used as an index into map 910, per implied (i.e. demonstrative, not actually stored) column 920. Thus, the first row of actual data in map 910 is for edge 2, as indicated by column 930, which is the only column that need actually be stored for map 910.

12.0 UNDIRECTED ARCS

Figure 11:
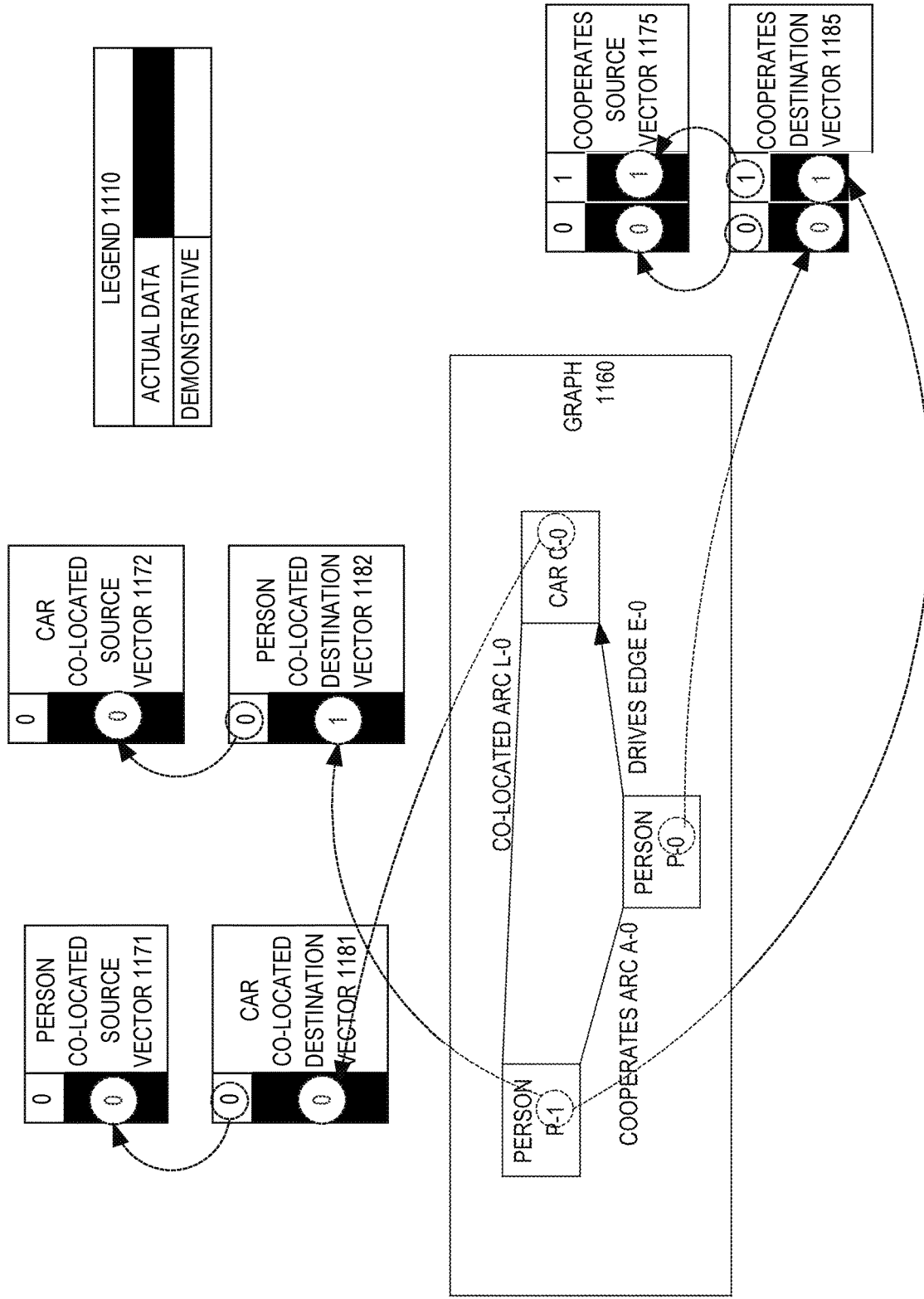
FIG. 11 is a block diagram that depicts an example RAM that contains endpoint vectors for undirected arcs, which are not directed edges, in an embodiment.

FIG. 11 is a block diagram that depicts an example RAM 1105, in an embodiment. RAM 1105 contains endpoint vectors for undirected arcs, which are not directed edges. Like directed edges, undirected arcs also have a type and connect a vertex of one type to a vertex of another type. However, neither vertex type is considered a source or a destination, because arcs lack direction. The computer of RAM 1105 may be an implementation of computer 100.

Heterogeneous graph 1160 contains undirected arcs and directed edges of various types including a drives edge type, a cooperates arc type, and a co-located arc type. Drives directed edge E-0 indicates that person P-0 is the driver of car C-0. A person can drive a car, but a car cannot drive a person. Thus, the drives edge type is necessarily directed due to the semantics (e.g. schema) of graph 1160.

Cooperates arc A-0 indicates that persons P-1 and P-2 mutually cooperate with each other. Mutual cooperation has no notion of direction. Thus, the cooperates arc type is necessarily undirected due to the semantics of graph 1160. Co-located arc L-0 is also undirected and indicates that person P-1 and car C-0 are in a same spatial location (not shown).

Instances of each of the connection (i.e. edge or arc) types of graph 1160 has enough endpoint vectors to achieve bidirectional (e.g. direct and reverse) access. For example, drives edge type has direct source and destination vectors (not shown) and reverse source and destination vectors (not shown), for a total of four endpoint vectors for bidirectional access.

Likewise, co-located arc type has a similar set of four endpoint vectors 1171-1172 and 1181-1182 for bidirectional access, although the comparative semantic notions of source and destination are absent because arcs are naturally undirected. Thus although vectors 1171 and 1181 operate together as a pair, and vectors 1172 and 1182 operate together as another pair, which pair is direct and which is reverse is logically undefined. However in practice, one of the vector pairs may have a same ordering of arcs as an arc array (not shown) of the co-located arc type. That vector pair may be direct vectors, and the other pair may be reverse vectors. Although not shown, the co-located arc type may have a translation map for use with the reverse pair, as described for FIG. 9.

12.1 Arcs with Homogeneous Endpoints

When both endpoint vertices of an undirected arc type have a same vertex type, then bidirectional arc access may be achieved with only one pair of endpoint vectors and no translation map as follows. For example, cooperates arc type connects two persons, such as persons P-0 and P-1 connected by cooperates arc A-0. In this case, endpoint vectors 1175 and 1185 are sufficient for bidirectional access to cooperates arcs. Unlike endpoint vectors 1171-1172 and 1181-1182 that each have one value (shown dark) per undirected arc, each of endpoint vectors 1175 and 1185 have two values (shown dark) per undirected arc.

Legend 1110 indicates that only the dark values of endpoint vectors 1171-1172, 1175, 1181-1182, and 1185 have actual data. The light value in the endpoint vectors indicate implied data not actually stored, which are offsets into those endpoint vectors. Bidirectional access occurs as follows for cooperates arc A-0. If exploring from person P-0, then the left dark column of cooperates source vector 1175 is used.

If exploring from person P-1, then the right dark column is used. Population of endpoint vectors 1171-1172 and 1181-1182 are described for FIGS. 11-12 as follows.

13.0 BIDIRECTIONALLY ENCODING ARCS HAVING HOMOGENEOUS ENDPOINTS

Figure 12:
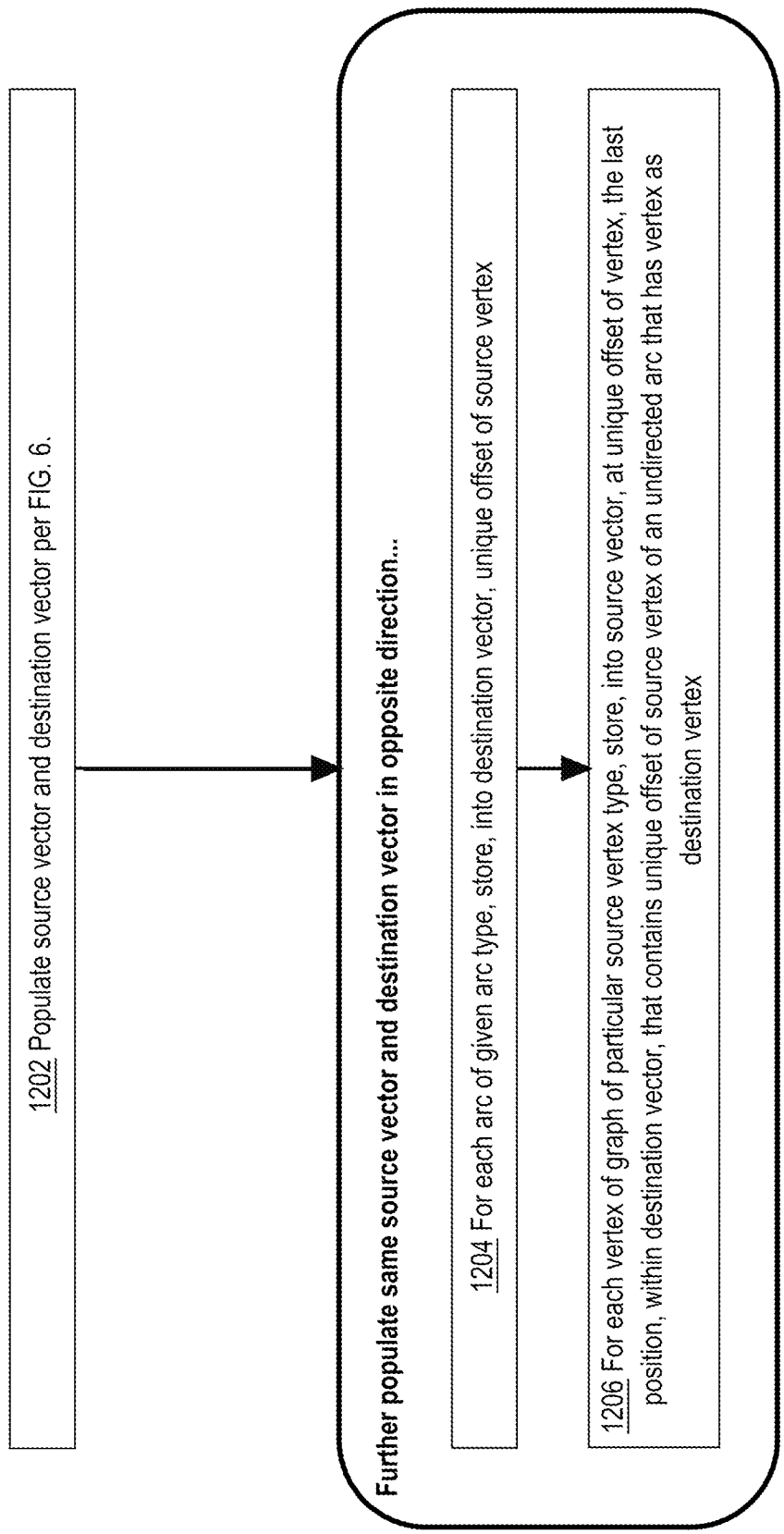
FIG. 12 is a flow diagram that depicts an example process for bidirectionally encoding undirected arcs having homogeneous endpoints, in an embodiment.

FIG. 12 is a flow diagram that depicts an example process for bidirectionally encoding undirected arcs having homogeneous endpoints, in an embodiment. FIG. 12 is discussed with reference to FIG. 11. The process depicted in FIG. 11 encodes arcs of a same arc type and may be repeated for each additional type of undirected arc having homogeneous endpoints.

13.1 Forward Encoding

Step 1202 loads edges, vertices, and properties more or less as described in FIGS. 5-6. For example, RAM 1105 may be loaded as an implementation of RAM 505. Step 1202 also loads undirected arcs that connect two different vertex types, such as co-located arc into vectors endpoint vectors 1171-1172 and 1181-1182. Loading of undirected arcs that connect two different vertex types may entail populating reverse endpoint vectors, such as with FIGS. 9-10, including map 910.

However, undirected arcs having homogeneous endpoints (i.e. arc type has same vertex for both endpoints) entail special loading as follows. In step 1202, reverse endpoint vectors and map 910, per FIGS. 9-10, are not created for undirected arcs having homogeneous endpoints. Instead, step 1202 loads only endpoint vectors in one direction for undirected arcs having homogeneous endpoints, and the other direction is populated later at steps 1204 and 1206. For example, step 1202 populates the left (i.e. offset 0) column of endpoint vectors 1175-1185. Support for bidirectional traversal of an arc type having homogeneous endpoints, such as cooperates arc, occurs during steps 1204 and 1206 as follows.

13.2 Backward Encoding

In step 1204, for each arc of a given arc type, a unique offset of a source vertex is stored into the arc type's destination vector. For that arc, the offset of the destination vertex was already stored into the destination vector during step 1202. For example, cooperate arc A-0 was stored as traversable from person P-1 to person P-0. Whereas, step 1204 instead records the source vertex into the destination vector. For example during step 1204, the second column (i.e. offset 1) of cooperates destination vector 1185 stores value 1 to indicate that cooperate arc A-0 may be traversed in an opposite direction from person P-0 to person P-1.

In step 1206, for each vertex having the particular source vertex type, the computer stores, into the source vector, at a unique offset of the vertex, the last position, within the destination vector, that contains a unique offset of a source vertex of an undirected arc that has the vertex as a destination vertex. For example, the last position in cooperates destination vector 1185 that was written to (during step 1204) is offset 1. Thus, step 1206 stores a 1 into the second column's value in cooperates source vector 1175. Thus, endpoint vectors 1175 and 1185 as shown support traversing cooperates arc A-0 in either direction. After step 1206, bidirectional storage of undirected arcs that have homogeneous endpoint types is complete, at which time endpoint vectors 1175 and 1185 may optionally become read only.

14.0 HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
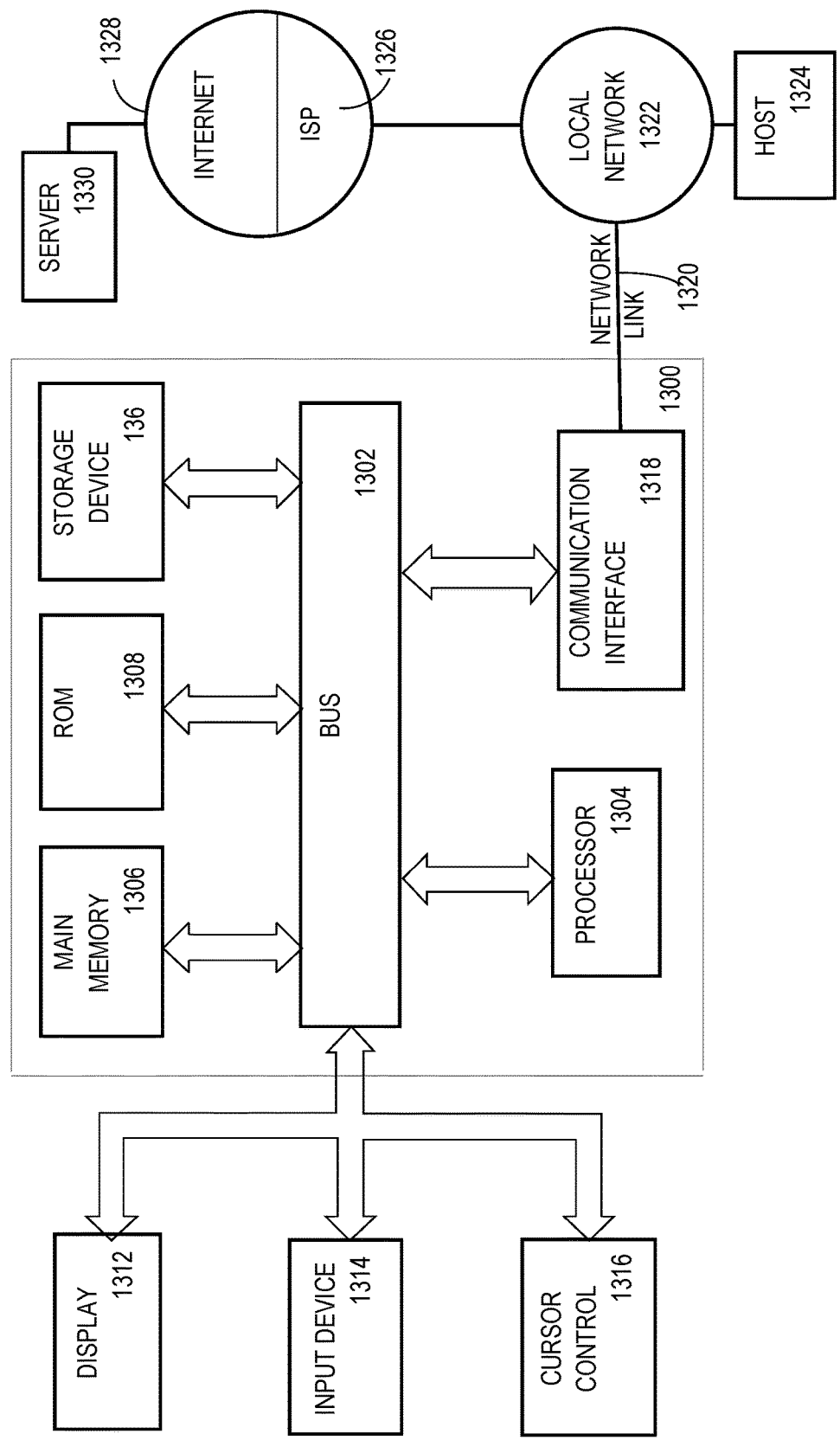
FIG. 13 is a block diagram that illustrates a computer system upon which an embodiment of the invention may be implemented.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 136, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 136. Execution of the sequences of instructions contained in main memory 1306 causes processor 1304 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 136. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 136 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 136, or other non-volatile storage for later execution.

15.0 SOFTWARE OVERVIEW

Figure 14:
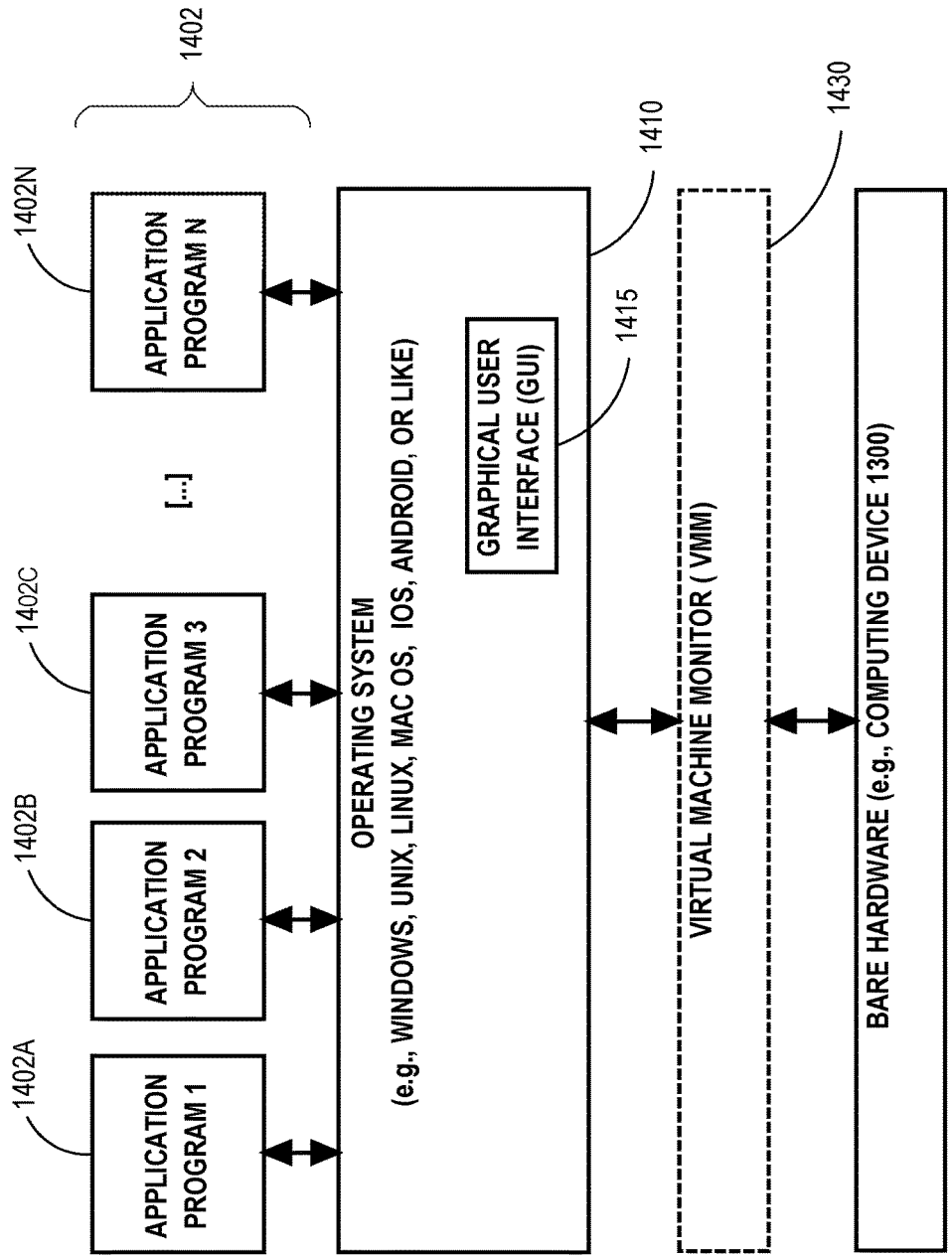
FIG. 14 is a block diagram that illustrates a basic software system that may be employed for controlling the operation of a computing system.

FIG. 14 is a block diagram of a basic software system 1400 that may be employed for controlling the operation of computing system 1300. Software system 1400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1400 is provided for directing the operation of computing system 1300. Software system 1400, which may be stored in system memory (RAM) 1306 and on fixed storage (e.g., hard disk or flash memory) 136, includes a kernel or operating system (OS) 1410.

The OS 1410 manages low-level aspects of computer operation, including managing execution of processes, memory allocation, file input and output (I/O), and device I/O. One or more application programs, represented as 1402A, 1402B, 1402C . . . 1402N, may be "loaded" (e.g., transferred from fixed storage 136 into memory 1306) for execution by the system 1400. The applications or other software intended for use on computer system 1300 may also be stored as a set of downloadable computer-executable instructions, for example, for downloading and installation from an Internet location (e.g., a Web server, an app store, or other online service).

Software system 1400 includes a graphical user interface (GUI) 1415, for receiving user commands and data in a graphical (e.g., "point-and-click" or "touch gesture") fashion. These inputs, in turn, may be acted upon by the system 1400 in accordance with instructions from operating system 1410 and/or application(s) 1402. The GUI 1415 also serves to display the results of operation from the OS 1410 and application(s) 1402, whereupon the user may supply additional inputs or terminate the session (e.g., log off).

OS 1410 can execute directly on the bare hardware 1420 (e.g., processor(s) 1304) of computer system 1300. Alternatively, a hypervisor or virtual machine monitor (VMM) 1430 may be interposed between the bare hardware 1420 and the OS 1410. In this configuration, VMM 1430 acts as a software "cushion" or virtualization layer between the OS 1410 and the bare hardware 1420 of the computer system 1300.

VMM 1430 instantiates and runs one or more virtual machine instances ("guest machines"). Each guest machine comprises a "guest" operating system, such as OS 1410, and one or more applications, such as application(s) 1402, designed to execute on the guest operating system. The VMM 1430 presents the guest operating systems with a virtual operating platform and manages the execution of the guest operating systems.

In some instances, the VMM 1430 may allow a guest operating system to run as if it is running on the bare hardware 1420 of computer system 1400 directly. In these instances, the same version of the guest operating system configured to execute on the bare hardware 1420 directly may also execute on VMM 1430 without modification or reconfiguration. In other words, VMM 1430 may provide full hardware and CPU virtualization to a guest operating system in some instances.

In other instances, a guest operating system may be specially designed or configured to execute on VMM 1430 for efficiency. In these instances, the guest operating system is "aware" that it executes on a virtual machine monitor. In other words, VMM 1430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

16.0 CLOUD COMPUTING

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, performed by one or more computers, and comprising:
   reading a one-to-one mapping between a) a plurality of database tables in a relational database and b) a plurality of vertex types in a graph being constructed in a volatile memory;
   for each column of a plurality of columns in the database table, populating, in the volatile memory, based on the one-to-one mapping, a respective distinct vertex property vector that contains only a plurality of values from the column;
   for each row of a plurality of rows in the database table:
      i) creating, in the graph, a vertex, which represents the row, as an instance of the distinct vertex type of the database table;
      ii) associating the vertex with a unique offset;
   wherein for each column of the plurality of columns, said populating comprises storing a value from the column of the row into the vertex property vector at the unique offset of the vertex; and
   reading the graph by accessing the vertex property vector of the distinct vertex type of the database table.

2. The method of claim 1 wherein said reading comprises executing a query of the graph by:
   detecting one or more vertex types are relevant to the query; and not accessing vertex property vectors of columns of a particular database table unless the particular database table is associated with a vertex type of said one or more vertex types.

3. The method of claim 1 wherein:
the method further comprises associating said distinct vertex type with a plurality of distinct edge types;
the reading of the graph comprises reading at least one instance of at least one edge type of the plurality of distinct edge types.

4. The method of claim 1 further comprising:
assigning a unique serial number to said distinct vertex type;
identifying a particular vertex that is an instance of a particular vertex type by an identifying pair that comprises: the unique serial number of the particular vertex type, and said unique offset of the particular vertex.

5. The method of claim 4 wherein said identifying pair consists of at most 128 bits.

6. The method of claim 4 wherein said identifying pair consists of at most 64 bits.

7. The method of claim 4 wherein the unique serial number of the particular vertex type and said unique offset of the particular vertex are bit packed within said identifying pair.

8. One or more non-transitory computer-readable media storing instructions that, when executed by one or more processors, cause:
reading a one-to-one mapping between a) a plurality of database tables in a relational database
and b) a plurality of vertex types in a graph being constructed in a volatile memory;
for each column of a plurality of columns in the database table, populating, in the volatile memory, based on the one-to-one mapping, a respective distinct vertex property vector that contains only a plurality of values from the column;
for each row of a plurality of rows in the database table:
 i) creating, in the graph, a vertex, which represents the row, as an instance of the distinct vertex type of the database table;
 ii) associating the vertex with a unique offset;
wherein for each column of the plurality of columns, said populating comprises storing a value from the column of the row into the vertex property vector at the unique offset of the vertex; and
reading the graph by accessing the vertex property vector of the distinct vertex type of the database table.

9. The one or more non-transitory computer-readable media of claim 8 wherein said reading comprises executing a query of the graph by:
detecting one or more vertex types are relevant to the query; and
not accessing vertex property vectors of columns of a particular database table unless the particular database table is associated with a vertex type of said one or more vertex types.

10. The one or more non-transitory computer-readable media of claim 8 wherein:
the instructions further cause associating said distinct vertex type with a plurality of distinct edge types;
the reading of the graph comprises reading at least one instance of at least one edge type of the plurality of distinct edge types.

11. The one or more non-transitory computer-readable media of claim 8 wherein the instructions further cause:
assigning a unique serial number to said distinct vertex type;
identifying a particular vertex that is an instance of a particular vertex type by an identifying pair that comprises: the unique serial number of the particular vertex type, and said unique offset of the particular vertex.

12. The one or more non-transitory computer-readable media of claim 11 wherein said identifying pair consists of at most 128 bits.

13. The one or more non-transitory computer-readable media of claim 11 wherein said identifying pair consists of at most 64 bits.

14. The one or more non-transitory computer-readable media of claim 11 wherein the unique serial number of the particular vertex type and said unique offset of the particular vertex are bit packed within said identifying pair.

15. A computer configured to:
read a one-to-one mapping between a) a plurality of database tables in a relational database
and b) a plurality of vertex types in a graph being constructed in a volatile memory;
for each column of a plurality of columns in the database table, populate, in the volatile memory, based on the one-to-one mapping, a respective distinct vertex property vector that contains only a plurality of values from the column;
for each row of a plurality of rows in the database table:
 i) create, in the graph, a vertex, which represents the row, as an instance of the distinct vertex type of the database table;
 ii) associate the vertex with a unique offset;
wherein for each column of the plurality of columns, said populate comprises store a value from the column of the row into the vertex property vector at the unique offset of the vertex; and
read the graph by accessing the vertex property vector of the distinct vertex type of the database table.

16. The computer of claim 15 wherein said read comprises execute a query of the graph by:
detecting one or more vertex types are relevant to the query; and
not accessing vertex property vectors of columns of a particular database table unless the particular database table is associated with a vertex type of said one or more vertex types.

17. The computer of claim 15 wherein:
the computer is further configured to associate said distinct vertex type with a plurality of distinct edge types;
the read of the graph comprises reading at least one instance of at least one edge type of the plurality of distinct edge types.

18. The computer of claim 15 wherein the computer is further configured to:
assign a unique serial number to said distinct vertex type;
identify a particular vertex that is an instance of a particular vertex type by an identifying pair that comprises: the unique serial number of the particular vertex type, and said unique offset of the particular vertex.

\* \* \* \* \*

UNITED STATES PATENT AND TRADEMARK OFFICE
CERTIFICATE OF CORRECTION

| | | |
|---|---|---|
| PATENT NO. | : 12,361,065 B2 | Page 1 of 1 |
| APPLICATION NO. | : 17/330046 | |
| DATED | : July 15, 2025 | |
| INVENTOR(S) | : Hilloulin et al. | |

It is certified that error appears in the above-identified patent and that said Letters Patent is hereby corrected as shown below:

On the Title Page

On page 2, Column 2, under item (56) Other Publications, Line 13, delete "Identifer"," and insert -- Identifier", --, therefor.

On page 2, Column 2, under item (56) Other Publications, Line 15, delete "identifer," and insert -- identifier, --, therefor.

In the Specification

In Column 1, Line 10, delete "Mar." and insert -- Apr. --, therefor.

In Column 7, Line 48, delete "Sparq1," and insert -- Sparql, --, therefor.

Signed and Sealed this
Twenty-third Day of December, 2025

John A. Squires
*Director of the United States Patent and Trademark Office*